(12) United States Patent
Garin

(10) Patent No.: US 8,271,189 B2
(45) Date of Patent: Sep. 18, 2012

(54) ENHANCED DATABASE INFORMATION FOR URBAN NAVIGATION

(75) Inventor: Lionel Jacques Garin, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 480 days.

(21) Appl. No.: 12/489,963

(22) Filed: Jun. 23, 2009

(65) Prior Publication Data

US 2010/0079332 A1    Apr. 1, 2010

Related U.S. Application Data

(60) Provisional application No. 61/100,609, filed on Sep. 26, 2008.

(51) Int. Cl.
*G01C 21/00* (2006.01)
(52) U.S. Cl. ........ 701/409; 701/412; 701/430; 701/447; 701/450; 701/468
(58) Field of Classification Search ................ 701/409, 701/412, 430, 438, 447, 450, 454, 468, 526
See application file for complete search history.

(56) References Cited

U.S. PATENT DOCUMENTS

| 4,949,268 | A | 8/1990 | Nishikawa et al. | |
|---|---|---|---|---|
| 6,313,786 | B1 * | 11/2001 | Sheynblat et al. | 342/357.23 |
| 6,707,422 | B2 | 3/2004 | Sheynblat et al. | |
| 6,973,119 | B2 | 12/2005 | Yotsumoto | |
| 7,298,327 | B2 * | 11/2007 | Dupray et al. | 342/451 |
| 2003/0087604 | A1 | 5/2003 | Stein et al. | |
| 2005/0068229 | A1 | 3/2005 | Moilanen et al. | |
| 2008/0129598 | A1 | 6/2008 | Godefroy et al. | |

FOREIGN PATENT DOCUMENTS

DE    10044393 A1    4/2002

OTHER PUBLICATIONS

Kontkanen et al., "Topics in Probabilistic Location Estimation in Wireless Networks," Proc. 15th IEEE Int. Symposium on Personal, Indoor and Mobile Radio Communications, Barcelona, Spain, IEEE Press, 2004.
Prost et al., "City Walk: Improving GPS Accuracy for Urban Pedestrians," "GPS World" magazine, Aug. 2008, pp. 32-37, www.gpsworld.com.
International Search Report and Written Opinion—PCT/US2009/057894—ISA/EPO—Mar. 9, 2010.

* cited by examiner

*Primary Examiner* — Gertrude Arthur JeanGlaude
(74) *Attorney, Agent, or Firm* — Linda G. Gunderson

(57) ABSTRACT

Methods and apparatus are provided for estimating position location of a mobile device.

26 Claims, 11 Drawing Sheets

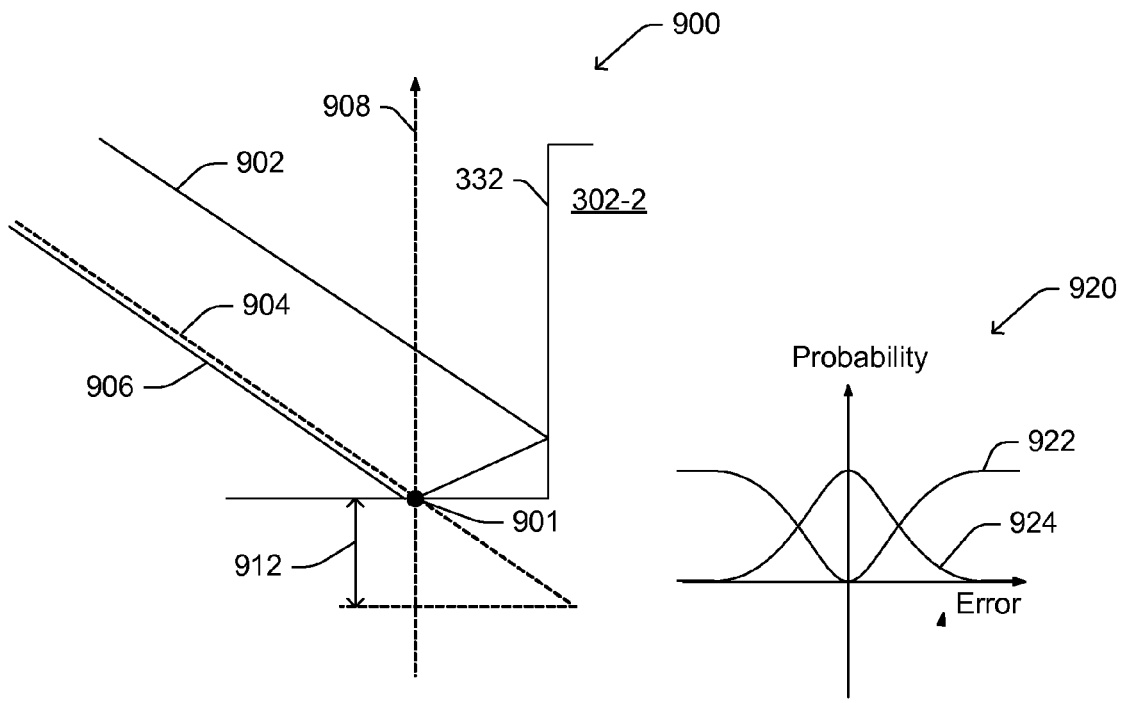
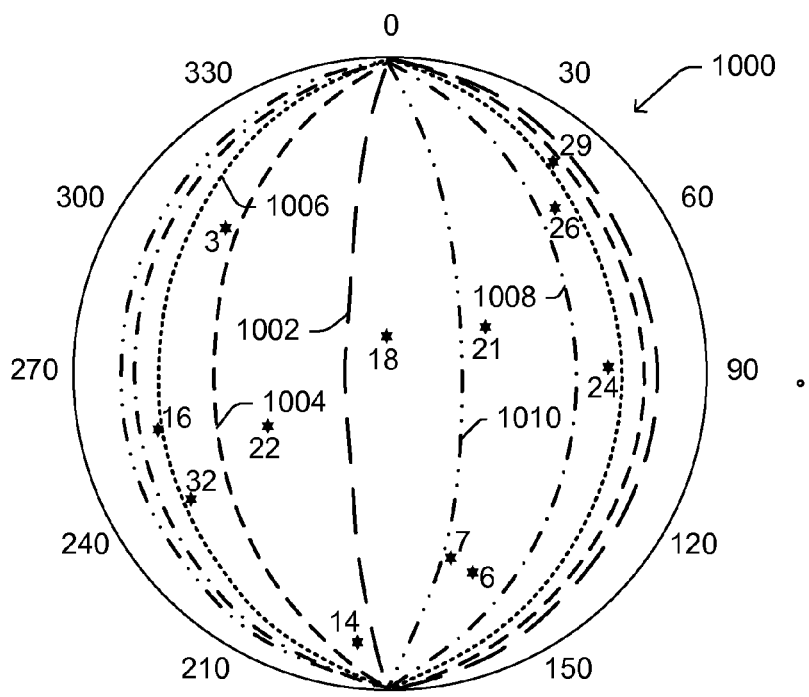
Fig. 9
Fig. 10

ENHANCED DATABASE INFORMATION FOR URBAN NAVIGATION

CROSS REFERENCE TO RELATED APPLICATIONS

This application claims priority to U.S. Provisional Patent Application Ser. No. 61/100,609, filed on Sep. 26, 2008, incorporated by reference herein in its entirety.

BACKGROUND

1. Field

The subject matter disclosed herein relates to electronic devices and more particularly to methods and apparatuses for use in electronic devices that perform and/or otherwise support position location determination.

2. Information

Navigation systems and devices and in particular satellite positioning systems (SPS) such as, for example, the Global Positioning System (GPS) and other like Global Navigation Satellite Systems (GNSS) are becoming more and more common. An SPS receiver, for example, may receive wireless SPS signals that are transmitted by a plurality of orbiting satellites of a GNSS. The SPS signals once received may be processed, for example, to determine a global time, an approximate geographical location, altitude, and/or speed associated for example with a mobile device, It may be useful to estimate a position location of a mobile device in environments, such as, urban regions, where buildings and other like structures may prevent or inhibit acquisition, of enough SPS signals to accurately estimate a location based solely on traditional techniques.

SUMMARY

Methods and apparatuses are provided for use in one or more electronic devices that perform and/or otherwise support position location determination.

In accordance with one aspect, methods are provided which may he implemented in at least one electronic device, to enable the device to access satellite signal visibility mask information that is associated with at least one satellite enabled to transmit an RF signal. Such device may establish enhanced database information that is associated with at least a plurality of point locations. For example, the point locations may be associated with a grid pattern that covers a geographical area. The enhanced database information may be established based, at least in part, on the satellite signal visibility mask information. Such device may then provide at least a portion of the enhanced database information to at least one mobile device. For example, enhanced database information may be transmitted to the mobile device over a wireless or wired communication link and/or otherwise transferred to the mobile device. In certain implementations, for example, a computer readable medium, such as memory, may be used to provide enhanced database information to a mobile station.

In certain example implementations, the satellite that transmits the RF signal may be intended for use in positioning. For example, the satellite may be a space vehicle (SV) that is part of a satellite positioning system (SPS). Thus, the satellite signal visibility mask information may include SPS signal visibility mask information. In certain example implementations, the satellite may be intended for one or more other uses. For example, the satellite may be an SV that broadcasts signals in support of a one-way or two-way communication system, and/or the like.

In certain further implementations, the method may be implemented to enable the electronic device to: establish the plurality of point locations as being geographically distributed within at least one open area portion of a region; and establish the signal visibility mask information for each of the plurality of point locations based, at least in part, on at least a portion of three-dimensional geographical information. By way of example, the three-dimensional geographical information may be associated with a geographic information system (GIS) database that specifies the open area and at least a height associated with at least one object adjacent to the open area. Here, for example, an open area may include one or more pathways (e.g., a street, etc.), and the object may include one or more buildings and/or other structures. In certain implementations, a grid may be aligned with at least one of an along-pathway direction and/or an across-pathway direction. Here, for example, all or portions of a grid may be uniform or non-uniform in at least one direction.

In certain implementations, the signal visibility mask information for each of the plurality of point locations may include a mask function that may be operatively enabled to establish expected azimuth/elevation information associated with potential line-of-sight (LOS) signal reception and/or potential non-line-of-sight (NLOS) signal reception. Thus, for example, the enhanced database information may include geographical coordinates for point locations along with the mask function for such point locations. In certain implementations, for example, the enhanced database information may include geographical coordinates for the point locations along with the signal visibility mask information for such point locations.

In accordance with another aspect, methods are provided which may be implemented in a mobile device to enable the mobile device to estimate an across-pathway position location by comparing an expected satellite positioning system (SPS) satellite reception pattern and an observed SPS satellite reception pattern. For example, a mobile device may be enabled to estimate an along-pathway position location based, at least in part, on at least one SPS signal acquired from at least one SV received LOS. Thus, given accurate enough lime source a single SV may be used. Of course a plurality of SV may also be used.

In certain implementations the method may be implemented to enable the mobile device to accessing enhanced database information for a plurality of point locations corresponding to the estimated along-pathway position location. The enhanced database may, for example, also include SPS signal visibility mask information for such point locations. As such, the method may be implemented to enable the mobile device to determine the expected SPS satellite reception pattern based, at least in part, on the SPS signal visibility mask information for each point locations.

In certain implementations the method may be implemented to enable the mobile device to read the enhanced database information from at least one computer-readable medium, and/or receive the enhanced database information over at least one communication link. In certain examples, the mobile device may be enabled to access an electronic map stored in a memory of the mobile device.

In certain implementations the method may be implemented to enable the mobile device to establish an observed SPS satellite reception pattern based, at least in part, on SPS signal reception determination of a LOS/NLOS detector that is operatively enabled within the mobile device. In certain examples, the SPS signal reception determination of the LOS/NLOS detector may be probabilistic.

In certain implementations the method may be implemented to enable the mobile device to determine the expected SPS satellite reception pattern based, at least in part, on estimated SPS satellite positions. For example, the estimated SPS satellite positions may be determined based, at least in part, on ephemeris information associated with the SPS satellites.

In certain implementations the method may be implemented to enable the mobile device to identify an estimated across-pathway position location as corresponding to one of the point locations based, at least in part, on at least one probabilistic attribute. For example, a probabilistic attribute may be operatively used in at least one of a Bayesian network calculation and/or hidden Markov chain calculation. In certain examples, a probabilistic attribute may be associated with at least one of a previous estimated across-pathway position location, and/or a previous estimated along-pathway position location. In certain examples, a probabilistic attribute may be associated with at least one of a time attribute and/or a measured mobile device movement attribute. In certain examples, a probabilistic attribute may be associated with at least one estimated SPS satellite position.

In certain implementations the method may be implemented to enable the mobile device to estimate a pseudorange between the satellite and the mobile device.

BRIEF DESCRIPTION OF DRAWINGS

FIG. 9 is an illustrative a diagram showing certain example signal reception angles with respect to an across-pathway position and a related LOS/NLOS graph in accordance with an implementation.

FIG. 10 is an illustrative graph showing a further example visibility mask plotted in polar representation in accordance with an implementation.

DETAILED DESCRIPTION

Figure 1:
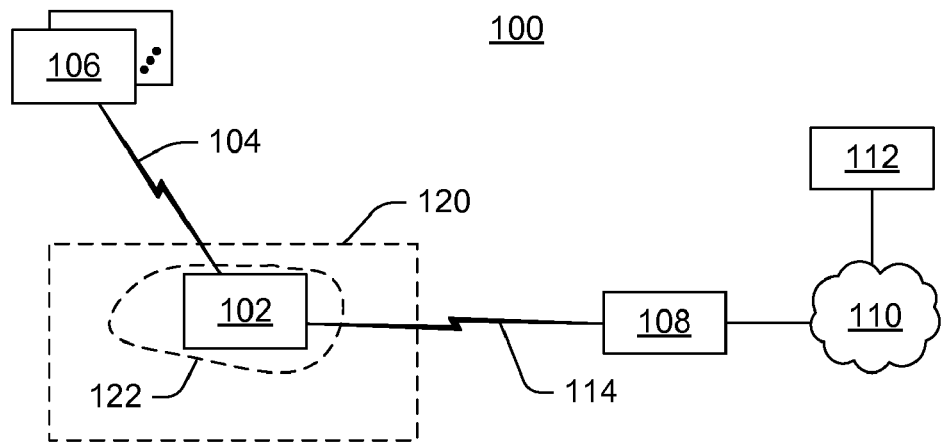
FIG. 1 is a block diagram illustrating an example environment that may be enabled to implement certain position location determination techniques in accordance with an implementation.

Non-limiting and non-exhaustive aspects are described with reference to the following figures, wherein like reference numerals refer to like parts throughout the various figures unless otherwise specified.

As described in greater detail in subsequent sections, in accordance with certain example implementations, methods and apparatuses may be provided for enhancing geographical information that may then be used to estimate a position location of a mobile device in environments, such as, urban regions, where buildings and other like structures may prevent or inhibit acquisition of enough SPS signals in direct visibility to accurately and/or efficiently estimate one's location based solely on traditional pseudorange estimation and geometric analysis.

An initial geographical information enhancement technique provided herein may, for example, be performed in advance by one or more computing devices and/or other like resources, and at least a portion of the resulting enhanced database information may be provided to a mobile device and/or other devices that may assist or otherwise support a position location process associated with the mobile device.

By way of example and introduction, certain methods for establishing enhanced database information may include accessing three-dimensional geographical information associated with a region (e.g., a city or portion thereof), and establishing a plurality of point locations geographically distributed (e.g., in a grid or other like manner) within at least one open area portion of the region. SPS signal visibility mask information may then be established for each of the plurality of point locations based, at least in part, on at least a portion of the three-dimensional geographical information. Enhanced database information may then be established, which may be associated with at least the plurality of point locations (e.g., geographical coordinates) and include some form of SPS signal visibility mask information (e.g., data and/or functions).

In certain examples, the three-dimensional geographical information may be extracted from and/or otherwise provided by a geographic information system (GIS) database or the like, which identifies at least one open area and at least a height associated with at least one object adjacent to the open area. Such a GIS database may identify a footprint or the like for the object and/or open area. The open area may, for example, include a "pathway". While the examples herein tend to illustrate pathways that are fairly straight (extending on an along-pathway direction) and fairly consistent in width (extending on an across-pathway direction), it should be understood that the techniques provided herein are applicable to pathways that vary in shape, e.g., in direction (curved), width (widening/narrowing), and/or elevation.

As used herein, a "pathway" is intended to broadly represent any open space through which and/or within which a mobile device may be moved about and that within which the mobile device may have at least some open sky to enable acquisition of at least some line-of-sight (LOS) SPS signals from "visible" SPS satellites. By way of example but not limitation, some pathways may include a street, an expressway, a sidewalk, a waterway, a bridge, an overpass, an alley, a median, a park, a plaza, a courtyard, etc.

An object may, for example, include one or more buildings and/or other types of structures that may be adjacent to or otherwise positioned in some manner to prevent acquisition of at least some SPS signals from "non-visible" SPS satellites by the mobile device via line-of-sight. Such signals may be received, however, via non-line-of-sight (NLOS) in certain instances (e.g., due to multipath).

As mentioned, in certain examples, at least a portion of the plurality of point locations may be geographically distributed in a grid or other like pattern. At least a portion of the grid may be aligned with at least one of an along-pathway direction and/or an across-pathway direction. In certain implementations all or portions of the grid (e.g., grid point spacing) may be uniform in all directions, or may be non-uniform in at least one direction.

SPS signal visibility mask information may, for example, include or otherwise operatively specify mask data and/or a mask function that establishes and/or may be used to establish expected azimuth/elevation information associated with potential LOS SPS signal reception and/or potential NLOS SPS signal reception for each of the plurality of point locations (grid points). Enhanced database information may include, for example, geographical coordinates for each of the plurality of point locations and the mask function and/or other like other for of the plurality of point locations.

All or part of enhanced database information may be stored, for example, on at least one computer-readable medium and/or otherwise provided or made available to the mobile device and/or other assisting/supporting devices. In certain examples the enhanced database information may be stored in a memory of the mobile device along with (and/or as part of) an electronic map or other like resource.

To estimate the location of a mobile device using such enhanced database information, the mobile device (alone or assisted) may, for example, first estimate an along-pathway position location based, at least in part, on at least two SPS signals acquired from different LOS satellites.

Enhanced database information may then be accessed and a plurality of point locations corresponding to the estimated along-pathway position location may be identified across-pathway along with corresponding SPS signal visibility mask information. An expected SPS satellite reception pattern may then be determined for each of the plurality of point locations based, at least in part, on the SPS signal visibility mask information. For example, an SPS satellite reception pattern may be determined based, at least in part, on the SPS signal visibility mask information and estimated SPS satellite positions (e.g., estimated using ephemeris data and mobile device approximate time and position). In certain example implementations, a mask function may be operatively enabled to establish expected azimuth/elevation information associated with potential LOS SPS signal reception, and/or a potential NLOS SPS signal reception.

Observed SPS satellite reception patterns may also be established, for example, based, at least in part, on SPS signal reception determination of a LOS/NLOS detector or other like function provided within the mobile device (and/or assisting device). In certain implementations, as illustrated herein, the SPS signal reception determination of the LOS/NLOS detector may be probabilistic.

An across-pathway position, location may then be estimated, for example, by comparing (or otherwise processing) expected SPS satellite reception patterns and observed SPS satellite reception patterns. As described in greater detail in subsequent sections, in certain example implementations an estimated across-pathway position location may be identified as corresponding to one of the plurality of point locations based, at least in part, on at least one probabilistic attribute. Here, for example, one or more probabilistic attributes may be associated with one or more previous estimated across-pathway position locations, and/or one or more previous estimated along-pathway position locations. A probabilistic attribute may, for example, be associated with a time attribute, and/or a measured mobile device movement (e.g., velocity, acceleration) attribute. A probabilistic attribute may, for example, be associated with at least one estimated SPS satellite position. Certain probabilistic attribute(s) may, for example, as described in greater detail below, be operatively used in and/or otherwise associated with Bayesian network, hidden Markov chain, and/or other like calculations.

Thus, as illustrated by certain examples herein, a mobile device (and/or assisting devices) may employ a two-stage position location determination process in which an along-pathway position location may first be estimated based, at least in part, on geometric-based pseudorange measurements for SPS signals acquired from LOS SPS satellites. Then an across-pathway position location may be estimated based, at least in part, on a comparison of expected LOS/NLOS determinations versus observed LOS/NLOS determinations. In certain example implementations, a "comparison" of expected LOS/NLOS determinations versus observed LOS/NLOS determinations may include probabilistic analysis based, at least in part, on one or more probabilistic attributes.

Attention is now drawn to FIG. 1, which is a block diagram illustrating an environment 100 that includes a mobile device 102 that may be operatively enabled to acquire SPS signals 104 from at least one SPS 106. As shown in this example, mobile device 102 may also (optionally) be operatively enabled to communicate over a wireless link 114 to other devices and/or networked devices, such as, e.g., a base station 108, a network 110, and/or a server device 112. As shown in FIG. 1, mobile device 102 may be located in a region 120, and more specifically within an open area 122.

Figure 2:
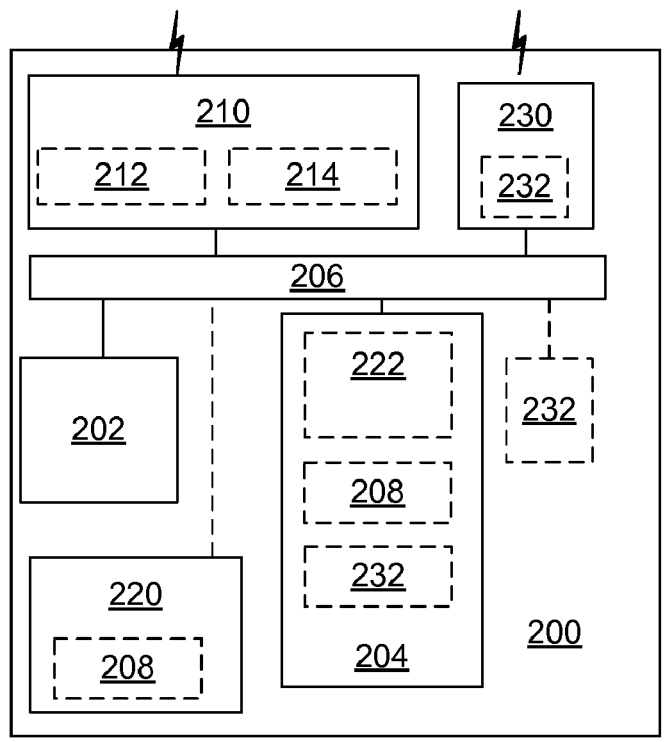
FIG. 2 is a schematic block diagram illustrating an exemplary device that may be enabled to implement at least a portion of certain position location determination techniques in accordance with an implementation.

Attention is drawn next to FIG. 2, which is a block diagram illustrating certain features of an exemplary device 200 that may, for example, be included in mobile device 102, server 112, and/or other devices, as applicable, to perform or otherwise support at least a portion of the example techniques described herein.

Device 200 may, for example, include one or more processing units 202, memory 204, a communication interface 210, an SPS receiver 230, which may be operatively coupled in some manner with one or more connections 206 (e.g., buses, lines, fibers, links, etc.).

Processing unit 202 may be implemented in hardware, software, or a combination of hardware and software. Thus, for example, processing unit 202 may represent one or more circuits configurable to perform at least a portion of a data computing procedure or process. By way of example but not limitation, processing unit 202 may include one or more processors, controllers, microprocessors, microcontrollers, application specific integrated circuits, digital signal processors, programmable logic devices, field programmable gate arrays, and the like, or any combination thereof.

Memory 204 may represent any data storage mechanism. Memory 204 may include, for example, a primary memory and/or a secondary memory. Primary memory may include, for example, a random access memory, read only memory, etc. While illustrated in this example as being separate from processing unit 202, it should be understood that all or part of a primary memory may be provided within or otherwise co-located/coupled with processing unit 202. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to, computer readable medium 220. As such, in certain example implementations, the methods and/or apparatuses presented herein may take the form in whole or part of a computer readable medium 220 mat may include computer implementable instructions 208 stored thereon, which if executed by at least one processing unit 202 may be operatively enabled to perform all or portions of the example operations as described herein. Such computer implementable instructions 208 may also be provided by memory 204, as also illustrated in this example.

Memory 204 may also include enhanced database information 222 that may be associated with the position location determination operations as described herein.

Communication interface 210 (optional) may, for example, include a receiver 212 and a transmitter 214, and/or combination thereof. As shown, communication interface 210 may be operatively enabled to communicate over a wireless communication link.

A LOS/NLOS detector 232 may be provided in various manners within device 200. For example LOS/NLOS detector 232 may be implemented, at least in part, in SPS receiver 230, as shown. In other examples, LOS/NLOS detector 232 may be implemented, at least in part, by processor 202 as illustrated by LOS/NLOS detector 232 represented by instructions and/or data within memory 204. In still other examples, LOS/NLOS detector 232 may be implemented, at least in part, as a separate circuit/processing unit, which as shown may be coupled to one or more connections 206.

In accordance with certain aspects, the techniques described in the following example "two-stage" position location implementations may provide significant improvement over SPS-only geometric position location techniques and/or may significantly improve positional accuracy and/or efficiency relative to a pathway and specifically with regard to estimating a position across or within the pathway. Such techniques may, for example, be implemented in various methods and/or apparatuses that may be associated with a mobile device that may provide accurate "urban canyon" navigation, and in particular examples, for pedestrian navigation.

Portions of the techniques herein may, for example, be implemented in various methods and/or apparatuses that may be associated with such mobile devices and/or one or more other computing platform devices that may assist a mobile device with position location determination and/or otherwise establish information that may be used in some manner by the mobile device to support position location determination.

As described in greater detail below, certain example methods and/or apparatuses may implement and/or otherwise operatively support a "two-stage" position location determination technique that may employ a combination of geometric positioning analysis based, at least in part, on received SPS signals and probabilistic positioning analysis based, at least in part, on expected and measured SPS satellite reception patterns (information).

While many of the examples described herein illustrate techniques that use geometric analysis to determine along-pathway positions and probabilistic analysis to determine across-pathway positions, it should be clear that in other examples both along-pathway and across-pathway positions may be determined based, at least in part, on probabilistic analysis. For example, a point grid may be two-dimensional, and a LOS/NLOS probabilistic detector may be used in both along-pathway and across-pathway directions. This may be useful, for example, at cross-streets, where there may be no well-defined along and across pathway directions or even in city squares or parks. Thus, one may use a two-dimensional point grid technique to "bootstrap" a position at cross-streets. Here, for example, a correct cross-street may be initially identified by using a geometric position technique (e.g., with at least 4 LOS or near-LOS satellites, identifiable with the mask database, and/or otherwise suitable for a traditional geometric positioning. A two-dimensional grid may be established at the crossroads, and a probabilistic analysis may be used subsequently to position the mobile device as it moves away from the cross-streets.

In certain example implementations a mobile device may include an SPS receiver and enhanced database information. The SPS receiver may, for example, include one or more of a GPS, GLONASS, GALILEO, and/or other like GNSS receiver that may be enabled to determine pseudorange measurements. The SPS receiver and/or other applicable circuitry may be enabled as a "detector" to provide satellite LOS/NLOS detection or similar determination. In certain example implementations, such a LOS/NLOS detector may be enabled such that the resulting determination is not necessarily discrete (e.g., binary absence/presence of LOS). Indeed, for certain example implementations a mobile device may be enabled to accommodate (and possibly even work better) with a probabilistic LOS/NLOS determination (e.g., 60% chance of LOS, 40% chance of NLOS). It is to note that the same visibility mask database information may be suited for any GNSS constellation for which a prediction of the satellite location as azimuth and elevation is available.

In certain implementations, the enhanced database information may include and/or otherwise be based at least in part on a two-dimensional (2D) database (e.g., possibly with POI (Point-Of-Interest) information), and additional attributes that may be associated with latitude and/or longitude of location (grid) points and SPS signal visibility mask information.

In certain example implementations, some enhanced database information may take the form of a special version of an electronic map that may reside within a mobile device. For example, at least a portion of an electronic map may be permanently installed in memory and/or other like computer-readable medium, downloaded or otherwise provided by another device (e.g., from a server, etc.) and stored in memory, as may be useful in a tiling or other like operational manner. Hence, some enhanced database information may reside in a server and/or other like network resources. As mentioned, in certain implementations all or portions of a position location determination may be performed by the mobile device, while in other implementations all or portions of a position location determination may be performed using such a server and/or other like assisting/supporting networked resource(s).

In certain implementations, enhanced database information may, for example, be generated (perhaps once, or periodically) from a three-dimensional (3D) urban GIS database or the like with desired accuracy level. By way of example but not limitation, an accuracy level of about 1-2 meters may be adequate for certain areas. Note that in certain implementations, lesser accuracy may impact the usability of the database. This type of three-dimensional database information may, for example, be available for most cities in the world from a number of GIS database resellers. Such three-dimensional database information may, for example, include a combination of topographic information (e.g., terrain altitude) along with footprints of buildings and other structures/features and their heights. In certain instances, a model may be employed for such buildings (and/or structures, features, etc.), which uses polygons that correspond to the perimeter of the building, extended with height in vertical dimension. Here, for example, with such models there may be little if any need for "in the field" tuning which may allow for a faster time-to-market for such GIS database information. Thus, in certain instances, such a three-dimensional database may only need to be recomputed if the layout of an existing building significantly changes (e.g., due to renovation or new constructions), or if other buildings (and/or structures, features, etc.) change in someway within a given area.

In certain example implementations, some three-dimensional database information may be stored in the mobile device and used in real-time (or near real-time) for position location determination along with a 3D database that may be used for visibility mask computation. In other example implementations, a position computation database may include a 2D database that may be simpler and/or require less memory for storage.

Pathways tend to have two directions, namely an along-pathway direction, and an across-pathway direction, which may be perpendicular to the along-pathway direction. SPS signals from satellites having orbits that are at least briefly approximately aligned along the pathway direction may incur little if any multipath effects, may be less likely to be blocked, and/or may have a high LOS probability (along with some delay spread, though). Accordingly, such "aligned" SPS signals from visible satellites may contribute the most to an along-pathway position determination.

To the contrary, SPS signals from satellites in azimuth ranges roughly perpendicular to the pathway direction may suffer the most from direct blockages, may have the most cases of NLOS, and/or may experience the most extreme cases of multipath effects. Hence, such "non-aligned" SPS signals from non-visible satellites may contribute more to an across-pathway position determination. However, such non-aligned SPS signals may be so significantly affected by multipath reception that their use for obtaining pseudorange measurements may be limited.

In the example implementations herein, the "aligned" SPS signals may be used for along-pathway position location determination and the "non-aligned" SPS signals may be used for across-pathway position location determination in an indirect manner as constrained, in part, by the along-pathway position determination.

In certain example implementations, one possible indicator of a LOS versus NLOS situation may be the relative amplitude of signal strength.

Figure 16:
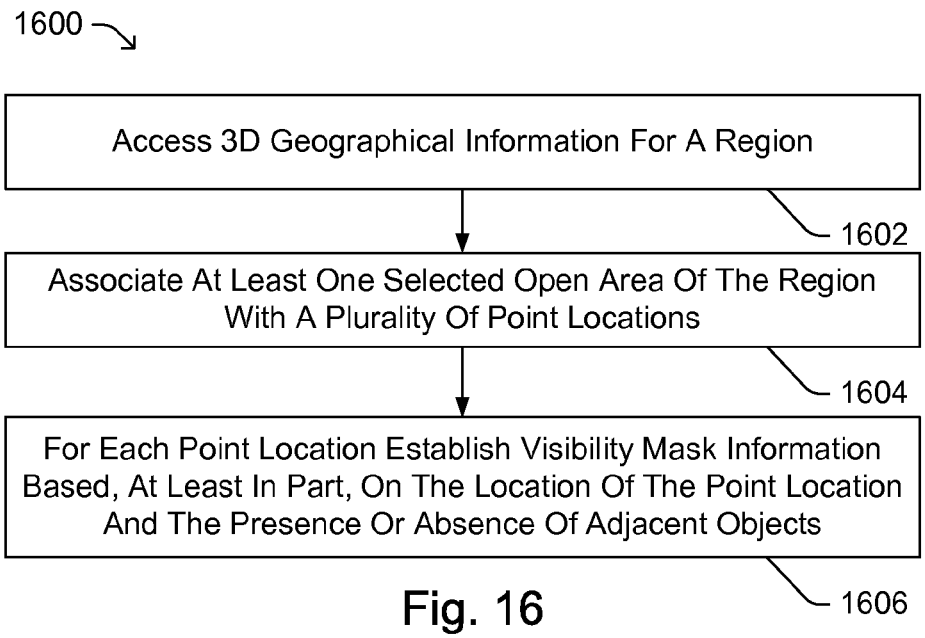
FIG. 16 is a flow-diagram showing an example method for establishing enhanced database information in accordance with an implementation.

Enhanced database information may, for example, be established using the following example processes, which may be mapped to the method 1600 as illustrated in the flow diagram example in FIG. 16. With regard to method 1600, for example, at block 1602 three-dimensional geographical information for a region may be accessed. At block 1604, at least one selected open area of the region is associated with a plurality of point locations. At block 1606, for each point location, visibility mask information may be established based at least in part on the location of the point location and the presence or absence of adjacent objects. Method 1600 may, for example, be performed in advance, off-line, etc., by one or more devices.

Thus, with such in mind, and by way of further example, a device may be enabled to associate a region with a grid pattern (e.g., a rectangular grid, etc), wherein the grid size may be dependent on a granularity of the SPS. Next, the device may be enabled to eliminate all location (grid) points that fall within the perimeters of buildings, structures, and/or other like non-open areas. Next, the device may be enabled to compute a visibility mask function (and/or mask data) parameterized with azimuth for each remaining grid point (in the open areas). Then, the device may be enabled to logically and/or otherwise operatively arrange this information into a database or other like data structure that may include, for example, grid point latitude and longitude coordinates, and a visibility mask function or at least an approximation of a visibility mask function, and/or associated mask data, for each grid point (e.g., a minimum elevation angle for LOS visibility, a local azimuth angle, etc.). For example, such enhanced database information may be computed using a 3D city GIS model, a radio propagation model, and/or the like.

Figure 17:
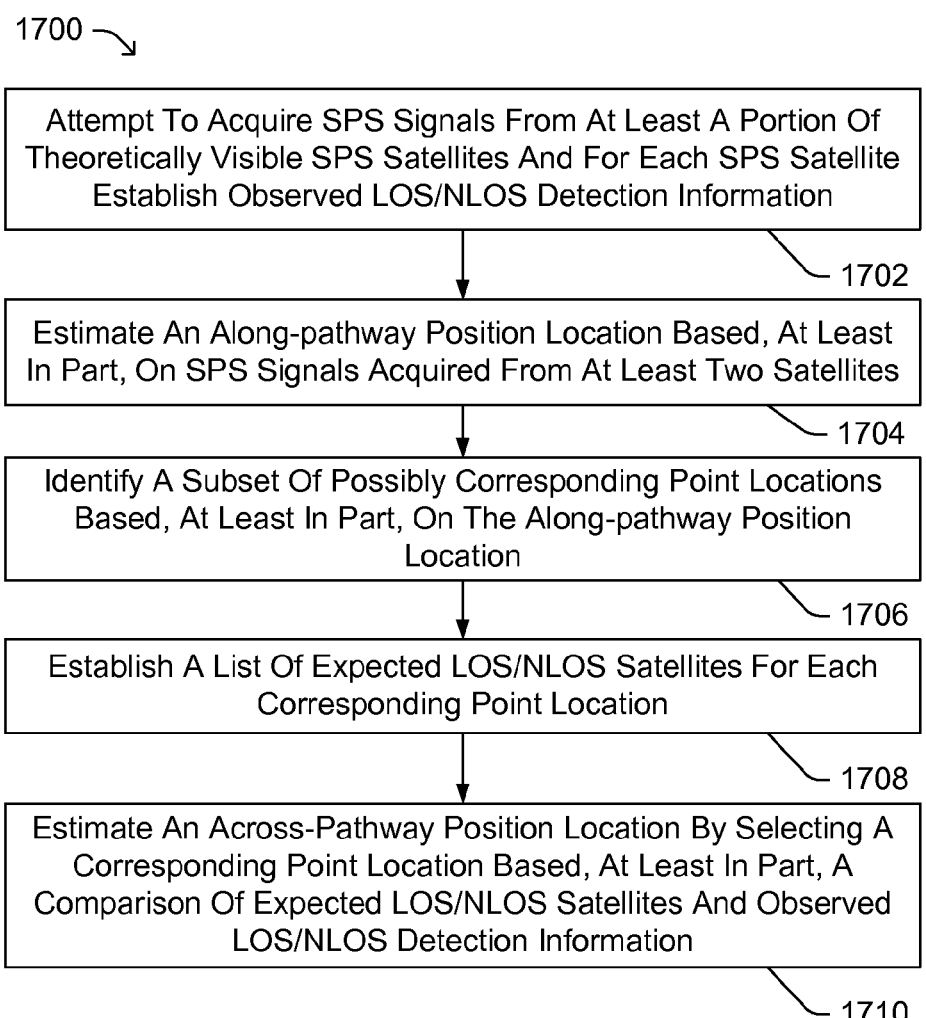
FIG. 17 is a flow-diagram showing an example method for using enhanced database information in accordance with an implementation.

Before illustrating example uses of such enhanced database information, attention is drawn briefly to method 1700 as illustrated in the flow diagram example in FIG. 17. Method 1700 may, for example, be implemented in whole or in part by a mobile device and/or assisting/supporting devices.

At block 1702, an attempt may be made to acquire SPS signals from at least a portion of the theoretically visible SPS satellites. For each SPS satellite, observed LOS/NLOS detection information may be established. At block 1704, an along-pathway position location may be estimated based, at least in part, on SPS signals acquired from at least two satellites. At block 1706, a subset of possibly corresponding point locations may be identified based, at least in part, on the estimated along-pathway position location. At block 1708, a list or other like data structure of expected LOS/NLOS satellites may be established for each corresponding point location. At block 1710, an across-pathway position location may be estimated by selecting a corresponding point location based, at least in part, a comparison of expected LOS/NLOS satellites and observed LOS/NLOS detection information.

By way of further example, such an enhanced database information may be used in real-time or near real-time as part of an iterative mode (e.g., a steady state operation). Here, for example, a mobile device may determine the pathway that it may be located within, and may have knowledge of one or more previous positions, e.g., within 5-10 m. Based at least in part on the enhanced database information and a previous (e.g., last) position (possibility propagated by corresponding velocity or other like movement information), the mobile device may at least estimate the general direction of the pathway.

Based at least in part on satellite ephemeris and/or other like information, the mobile device may at least approximate a time and position for the (theoretically) visible satellites (e.g., as if in open sky) and azimuth/elevations pairs may be established for these satellites. Such information may, for example, be arranged in a table or other like data structure. SPS signal measurements may then be collected, along with corresponding LOS/NLOS determination (e.g., detector status).

In certain instances, a minimum subset of two satellites may then be selected as being the closest of the general direction of the pathway in azimuth. The pseudorange measurements to these satellites may be used in a single differencing technique, for example, and along with an average altitude of the pathway (or an interpolated altitude of grid points) at the longitudinal pathway position to determine an along-pathway position for the mobile device. The along-pathway position location determination may also be associated with an uncertainty parameter.

Based at least in part on the along-pathway position location determination and uncertainty parameter, a subset of grid point(s) falling within such an uncertainty domain may be selected and extracted from the enhanced database information along with corresponding visibility mask information. Based at least in part on the visibility mask information for each selected grid point, and the established satellite azimuth/elevation information (e.g., table), the satellites may be classified or otherwise identified as expected LOS or NLOS. Depending on the parallax experienced from various grid positions, the resulting lists may be different for each grid point. A comparison/match between expected LOS (e.g., from the grid) satellites and observed LOS satellites may be made, and based at least in part thereon, an across-pathway position location determination made based on a best match. The combination of along-pathway and across-pathway position determinations may then be returned and/or otherwise provided as a final estimated position location for the mobile device.

In certain implementations, an initial position location determination may be made to provide a starting point for further positioning determination. Here, for example, the SPS signaling environment may present shadowing patterns or the like in parallel pathways, perhaps even with similar building heights, that may be very similar, and as such may not be reliable enough to determine with desired confidence which pathway the mobile device is starting from. In accordance with certain implementations, a geometric computational approach may, for example, be employed until either an uncertainty domain encompasses grid points with significantly different-shadowing patterns, and/or until at least a threshold number (e.g., four) of SPS signals from satellites with LOS have been acquired. For example, a position computation may be made based at least in part on the received SPS signal and used in some manner to seed a probabilistic determination. Such a situation may arise, for example, as a mobile device reaches pathway crosses, intersections, and/or other like potentially more open areas and/or possible direction changing areas wherein the threshold number of SPS signals from satellites with LOS may be available. The position may then be propagated according to Markov chains (e.g., to take advantage of position history) and/or the like and an along-pathway/across-pathway algorithm.

Figure 3A:
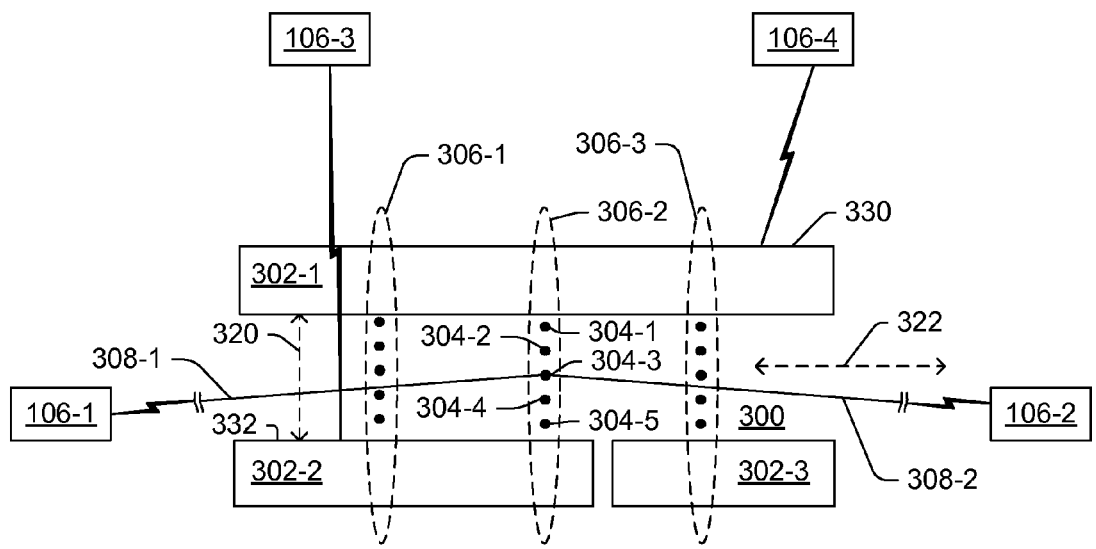
FIG. 3A is an illustrative diagram showing an exemplary urban environment having an open area and adjacent objects within which certain position location determination techniques in accordance with an implementation may be employed.
Figure 3B:
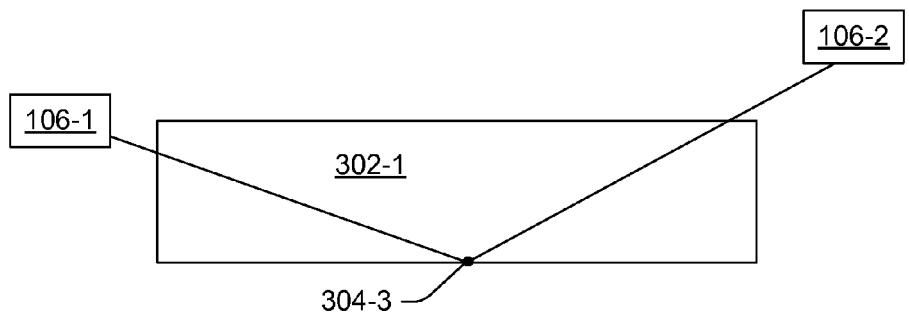
FIG. 3B is an illustrative diagram showing a different perspective of a portion of the exemplary urban environment of FIG. 3A.

To further illustrate such techniques, attention is now drawn to FIGS. 3A and 3B, which are related and graphically illustrate certain along-pathway positions and across-pathway positions for a mobile device within a pathway located between buildings, and potential SPS signal reception. FIG. 3A shows a horizontal view looking down on a pathway 300. FIG. 3B shows a vertical view from within pathway 300 with a building 302-1 in the background.

More specifically, FIG. 3A shows pathway 300 between building 302-1 (e.g., on what will be referred to as the left hand side) and buildings 302-2 and 302-3 (e.g., on what will be referred to as the right hand side). Various possible positions 304 (point locations) for a mobile device within pathway 300 are illustrated. For example, across-pathway positions 304-1, 304-2, 304-3, 304-4, and 304-5 are illustrated in a widthwise association, which in this example is perpendicular to the pathway direction. As illustrated by the dashed ovals in this example, adjacent across-pathway positions may be associated with certain along-pathway positions, 306-1, 306-2 and 306-3 that have a lengthwise association, which in this example is parallel to the pathway direction. Here, the dashed oval may also illustrate that some along-pathway positional uncertainty may actually extend into other pathways.

In FIG. 3A, SPS satellites 106-1 and 106-2 may be visible, LOS satellites as their signals 308-1 and 308-2, respectively, may be acquired by a mobile device at point location 304-3, for example. SPS satellites 106-3 and 106-4 may not be visible, and considered to be NLOS satellites for a mobile device at point location 304-3, for example. Here, for example, signals from SPS satellite 106-3 may suffer from multipath from surface 332 of building 302-2, and signals from SPS satellite 106-3 may be substantially or completely blocked by surface 330 of building 302-1 for a mobile device at point location 304-3.

In FIG. 3B, by way of further example two signals are illustrated as being transmitted from LOS satellites 106-1 and 106-2 and available to a mobile device if located at about any point location of along-pathway position 306-2. FIG. 3B illustrates elevation angles for such SPS signals and potential vertical constraints associated with building 302-1 that may affect signal reception. As illustrated, an along-pathway position location determination may be estimated based, at least in part, on at least the two SPS signals.

Figure 4:
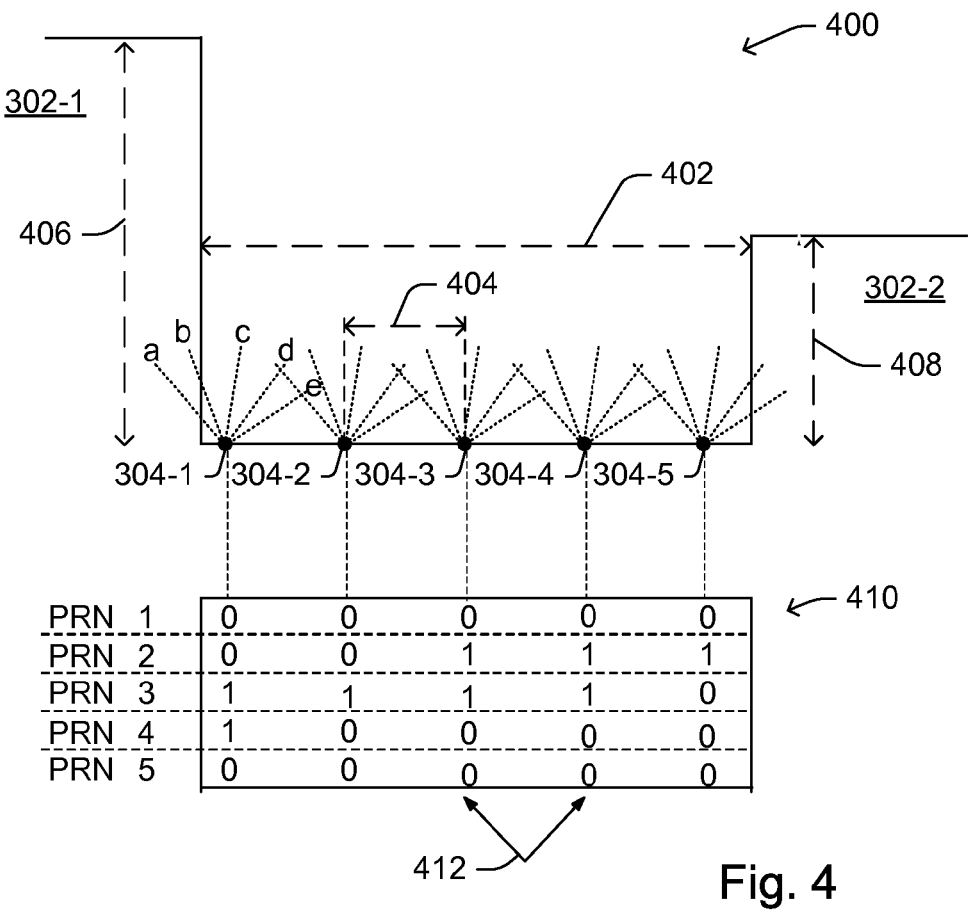
FIG. 4 is an illustrative diagram showing an exemplary urban environment having an open area and adjacent objects within which certain position location determination techniques in accordance with an implementation may be employed.

FIG. 4 is similar to FIGS. 3A and 3B, and illustrates a vertical view from the pathway with building 302-1 on the left hand side and building 302-2 on the right hand side. As illustrated in the example, building 302-1 may have a height 406 of 90 meters (e.g., about twenty floors), building 302-2 may have a height 408 of 22.5 meters (e.g., about five floors), pathway 300 may have a width 402 of 23 meters, and a grid step distance 404, between adjacent point locations 304, may be 5 meters. Of course, unless stated otherwise, all measurements presented herein are by way of example only.

As illustrated in FIG. 4 by the directional lines (e.g., labeled a, b, c, d, e) extending outward at certain angles from each point location 304, some SPS signals may be blocked or otherwise subjected to the shadowing pattern associated with buildings 302-1 and/or 302-2. Table 410 includes columns aligned below the illustrated point locations and rows for particular SPS signals that may or may not be received in LOS from a given satellite (e.g., identified as PRN 1, 2, 3, 4, and 5) for each of the illustrated point locations. Here, for example, a "1" is listed if a particular SPS signal may be received in LOS at a point location, and a "0" is listed if a particular SPS signal may not be received in LOS (e.g., may or may not be received NLOS) at a point location. Thus, for example, a SPS signal from PRN 2 may be received in LOS at or nearby point locations 304-3, 304-4, and/or 304-5, but may not be received LOS at or nearby point locations 304-1 and/or 304-2, while an SPS signal from PRN 4 may be received in LOS only at or nearby point location 304-1. Also, for example, SPS signals from PRN 1 and/or PRN 5 may not be received in LOS at or nearby any of the point locations 304-1, . . . , 304-5.

As further illustrated in FIG. 4 by arrows 412 pointing to the columns associated with point locations 304-3 and 304-4, in certain situations two or more point locations may share the same pattern of LOS/NLOS signal reception. Here, for example, at point locations 304-3 and 304-4 SPS signals from PRN 1, PRN 4 and PRN 5 may be received in NLOS while SPS signals from PRN 2 and PRN 3 may be received in LOS.

In accordance with certain aspects of the present description, further point location determination/discrimination may be established using certain exemplary probabilistic techniques, for example, as described in greater detail below.

Furthermore, in accordance with certain aspects a mobile device may be enabled to apply a pseudorange measurement single difference using at least the two SPS signals to reduce and/or eliminate receiver clock error that may be inaccurately known since it may not be possible at times to make a full position location determination (estimate) along with receiver clock error determination.

One potential classification concern is determining which pre-computed shadowing pattern in the grid may provide the best match with an observed one. Such concern may, for example, be addressed based, at least in part, using a Bayesian inference engine that may be associated with a hidden Markov chain for handling time sequence constraints.

In accordance with certain aspects of the present description, techniques are provided for use in determining (estimating) a point location based, at least in part, on a combination of Bayesian networks and hidden Markov chains to provide probabilistic position estimations based on SPS signals. In an example implementation, a grid may be logically established with respect to the general direction of the pathway (e.g., within a given area). Each grid point may be associated with a theoretical LOS/NLOS pattern that may, for example, be established and/or otherwise obtained from a visibility mask at the grid point azimuth/elevation (Az/El) and an approximate satellite location expressed in local coordinate system (Az/El), e.g., which may he computed on the fly.

Figure 5:
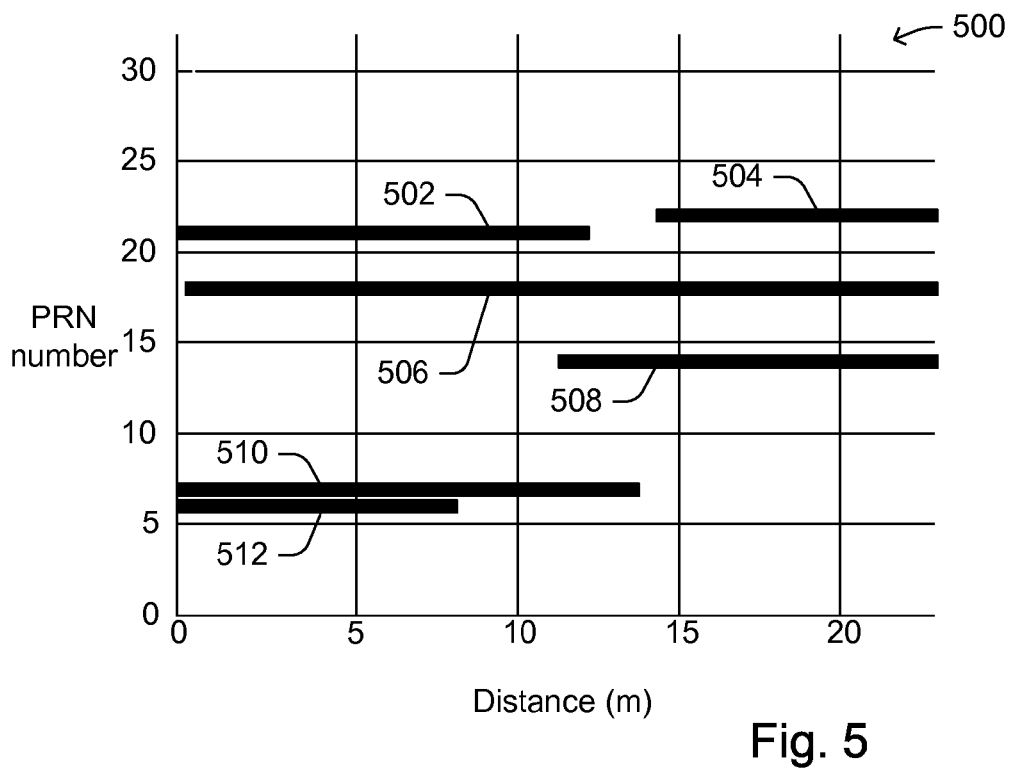
FIG. 5 is an illustrative graph showing example satellite visibility based on distance from an object in accordance with an implementation.

A LOS/NLOS reference pattern may be established and/or otherwise obtained based, at least in part, on a satellite direct visibility analysis and/or the like. FIG. 5 shows a graph 500 of satellite visibility versus distance from a building (to the left), in which the vertical axis lists a range of PRN numbers and the horizontal axis lists the distance in meters (m). Graph 500 is associated therefore with a plot of a cross section of a pathway, which in this example is 23 m wide, and is bounded by 20 m-high buildings on both sides. Lines 502, 504, 506, 508, 510, and 512 represent where in the cross section a given satellite may be received in direct LOS. For example, counted as cross-distance from the left building, as illustrated by line 502 the satellite PRN 21 may be in LOS visibility from the left building (0 m) up to about 12 m, as illustrated by line 502 the satellite PRN 22 may be in LOS visibility from about 14 m to the right building (23 m), and as illustrated by line 504 the satellite PRN 18 may be in LOS visibility from about the left building (0 m) to the right building (23 m). These example visibility plots may be sampled at regular or various grid points, e.g., at 5 m, 10 m, 15 m and 20 m from the left building. Thus, a LOS visibility list may be extracted at each grid point from the visibility plot.

To better formalize the process, let $D_{Grid}$ be a vector of grid distances from the left building in meters:

$$D_{Grid} = [5\ 10\ 15\ 20]$$

Let, $L_{Grid}(t_{n-1})$ be a mass probability of being located at a grid point at time $t_{n-1}$ (e.g., before the first application of this algorithm). This may be understood as the starting or initial position. If nothing is known a priori, it may arbitrarily be evenly distributed over the whole width of the pathway. In the example, let's assume that the user of the mobile device starts in a position at the rightmost position in the pathway (e.g., on a sidewalk adjacent the building on the right side). Thus, $$L_{Grid}(t_{n-1}) = [0\ 0\ 0.1\ 0.9]$$

A complete list of pathway-visible satellites, e.g., in LOS condition from at least one point of the pathway (not the full list of satellites above the horizon in an open sky hypothesis), may be given by RefSatList:

$$RefSatList = [6,7,14,18,21,22]^7$$

A LOS visibility list at each grid point may be described as an array, LOSPATTERN, with columns representing for each location in the grid the LOS visibility of all satellites, and rows representing the LOS visibility for a particular satellite at all grid points. Here, row indexes may correspond to RefSatList indexes, and column indexes may correspond to $D_{grid}$ indexes. Below, for example, is a spatial sampling based on graph 500:

$$LOSPATTERN = \begin{bmatrix} 1 & 0 & 0 & 0 \\ 1 & 1 & 0 & 0 \\ 0 & 0 & 1 & 1 \\ 1 & 1 & 1 & 1 \\ 1 & 1 & 0 & 0 \\ 0 & 0 & 1 & 1 \end{bmatrix}$$

The measurements $P_{LOS}$ provided by a receiver for the across-pathway position location may be a vector of LOS probabilities for each satellite in the RefSatList list. Column index may refer to the satellite in RefSatList with the same index. In certain example implementations, measurements may be associated with a LOS/NLOS detector, and/or established using other like means. This may not necessarily indicate that multipath is present or absent in a compound signal, but that at least LOS may be present. Thus, $$P_{LOS} = [0.05\ 0.1\ 0.8\ 0.9\ 0.1\ 0.8]$$

Here, the example is contrived, as the measurements do not come from an actual receiver, but essentially describe what is believed one might experience when located at about 15 meters from the left building. In this example, the probability value has been chosen to be higher than 0.5 when visible, and the farthest from the LOS/NLOS transition, the closest to certainty 1. For example, the satellite PRN 18 may be seen in visibility all across the pathway, therefore it has high LOS probability (0.9). The satellite PRN 14 and PRN 22 which may be seen in visibility, and appear farther from a LOS/NLOS transition, have been assigned a high LOS probability of 0.8. The NLOS satellite probabilities have been assigned following a similar reversed logic. For example, probability may be lower than 0.5 when NLOS, and closer to 0 when farther from a LOS/NLOS transition.

The following vector is the probability of location of the receiver at each grid point, conditioned with the observation pattern $P_{LOS}$. This is the observation (o) probability given a specific location (l).

Applying the Bayes rule $$p(l|o) \cdot p(o) = p(o|l) \cdot p(l)$$

for a single grid point, provides:

$$p(l|o) = \frac{p(o|l), p(l)}{p(o)} = K \cdot p(o|l) \cdot p(l)$$

Where p(o|l) is the probability to observe o given the location l p(l) is the a-priori probability of being at the grid point l before updating with measurements p(l|o) is the probability of being at l, given o is observed.

$$K \frac{1}{(=p(o))}$$

may be considered as a normalizing constant, and adjusted so that $\Sigma_{GridP}(D_{Grid}|o) - 1$.

Thus, generalizing over all grid points, provides:

$$p(o|GRID) = P_{LOS} \cdot LOSPATTERN = [1.1500\ 1.1000\ 2.5000\ 2.5000]$$

The Bayes formula, simultaneously applied to the whole grid becomes $$p(GRID(t_n)|o) = K \cdot p(o|GRID) \cdot p(GRID(t_n))$$

With K chosen such as $\Sigma_{Grid} p(GRID|o) = 1 \cdot p(GRID(t_n))$ may be estimated using a hidden markov chain, and using the last estimated across-pathway position location. Here, for example, the idea is that the user of a mobile device may be more likely to follow a path in the along-pathway direction, rather than the across-pathway The transition matrix between cross grid at $t_{n-1}$ and $t_n$, $p(D_{Grid}(t_n)|D_{Grid}(t_{n-1}))$ may, for example, be expressed as:

$$p(GRID(t_n)|GRID(t_{n-1})) = \begin{bmatrix} 0.7 & 0.2 & 0.1 & 0.0 \\ 0.2 & 0.6 & 0.2 & 0.00 \\ 0.00 & 0.2 & 0.6 & 0.2 \\ 0.00 & 0.1 & 0.2 & 0.7 \end{bmatrix}$$

Note this is just an arbitrary example, which may be tuned and/or otherwise modified/adapted as needed in practice.

Such may be used to capture that in practice pedestrians have much more tendency to stay on course (e.g., same distance from the left side building), and also to stay on the left hand side or right hand side sidewalk if there already. If one were in the middle of the pathway, there may be about equal chance of movement towards the left or the right side (perhaps relatively expediently, as in crossing the pathway).

Figure 6:
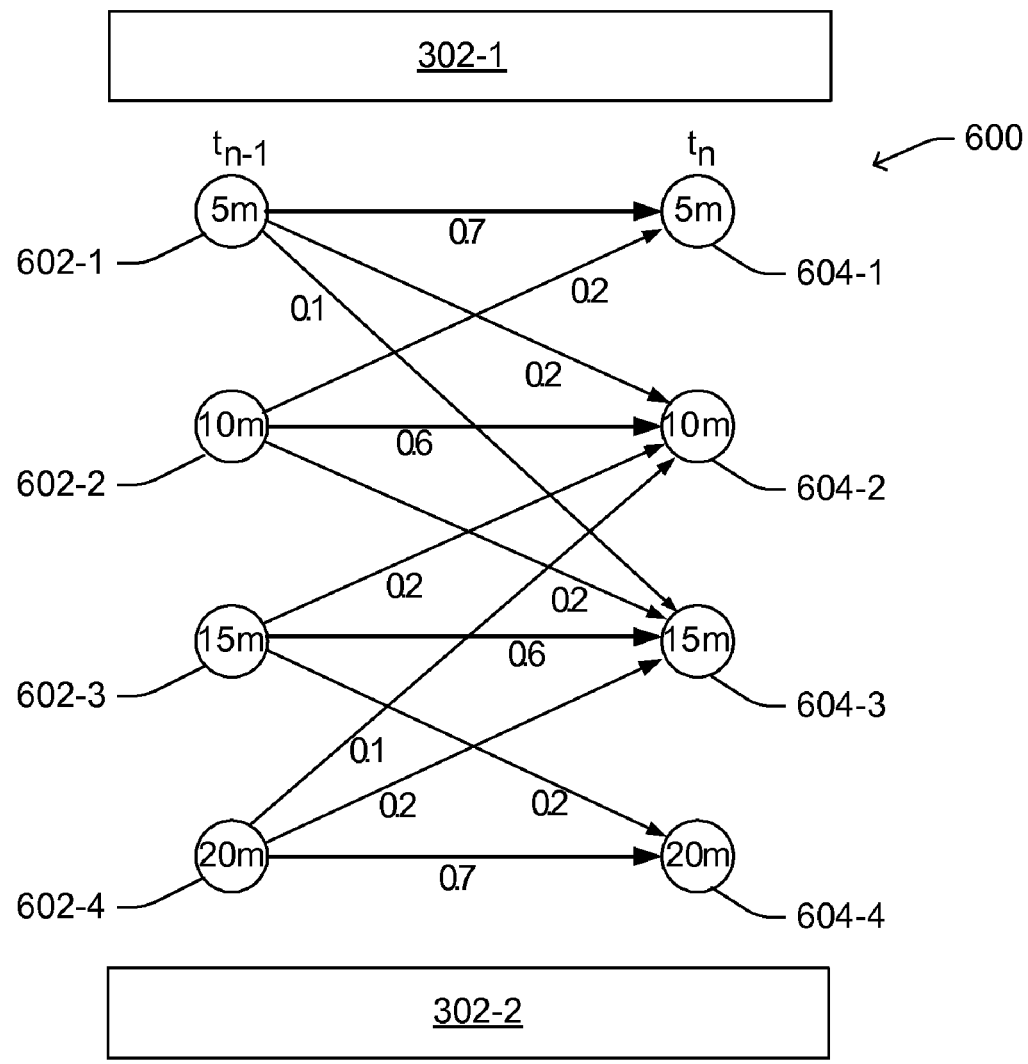
FIG. 6 is an illustrative graph of a state transition matrix in accordance with an implementation.

With such in mind, FIG. 6 illustrates a graph 600 of a state transition matrix. FIG. 6 includes buildings 302-1 (left hand side) and 302-2 (right hand side) and located there between point locations 602-1, 602-2, 602-3, and 602-4.

In this example, it may be assumed that the location, probability distribution at time $t_{n-1}$ was obtained by application of tire same formula at time tn–1, hence:

$$p(GRID(t_{n-1})) = [0\ 0\ 0.1\ 0.9]$$

The a-priori probability to be at each point of the grid is:

$$p(GRID(t_n)) = p(GRID(t_{n-1})) \cdot p(GRID(t_n)|GRID(t_{n-1}))$$

In this numerical case, therefore:

$$p(GRID(t_n)) = [0\ 0.11\ 0.24\ 0.65]$$

$$p(GRID|o) = K \cdot p(o|GRID(t_n)) \times p(GRID(t_n))$$

where "x" denotes the component by component multiplication. Thus, $$p(GRID|o) = 0.4263 \cdot [1.1500\ 1.1000\ 2.5000\ 2.5000] \times$$
$$[0\ 0.11\ 0.24\ 0.65]$$
$$= [0\ 0.0516\ 0.2558\ 0.6927]$$

A final reported across-pathway position location may be the mathematical expectation of location when given observation:

$$E(GRID|o) = \sum_{l' \in GRID} l' \cdot p(l'|o) = D_{Grid} \cdot p(GRID|o)$$

where the '.' (dot) operator denotes a dot product $$E(GRID|o) = [5\ 10\ 15\ 20] \cdot [0\ 0.0516\ 0.2550\ 0.6927]$$
$$= 18.20$$

Figure 7:
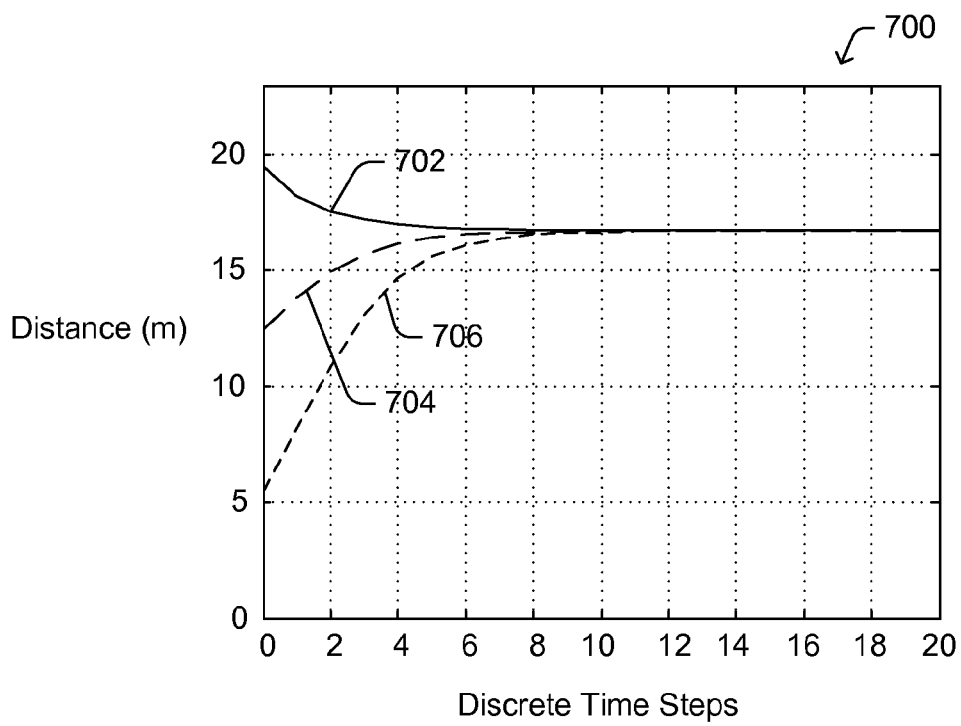
FIG. 7 is an illustrative graph showing a cross pathway error versus time in accordance with an implementation.

FIG. 7 shows a graph 700 illustrating across-pathway error versus time, with an estimated distance (m) from the building on the left hand side on the vertical axis and discrete time steps on the horizontal axis. Lines 702, 704 and 706 are shown, which illustrate a convergence to the same across-pathway value from arbitrary starting points, continuously applying the same measurement vector $P_{LOS} = [0.05\ 0.1\ 0.8\ 0.9\ 0.1\ 0.8]$. For example, line 702 corresponds to an initial point $p(GRID(t_0)) = [0\ 0\ 0.1\ 0.9]$ or an expected cross distance of 19.5 meters.

Here, for example, the "convergence" speed may be directly related to the Markov transition matrix numbers. It is conceivable, however, that the Markov transition matrix may be different for car navigation versus pedestrian navigation. Thus, the transition values may, for example, be adjusted according to a time interval size and to an average linear velocity of the receiver, and/or other like factors, e.g., as maybe established or otherwise obtained from a longitudinal SPS algorithm.

The error of the final across-pathway distance value from the theoretical value of 15 meters may be due, at least in part, on to the somewhat arbitrary method used to construct the example measurement vector.

Figure 8:
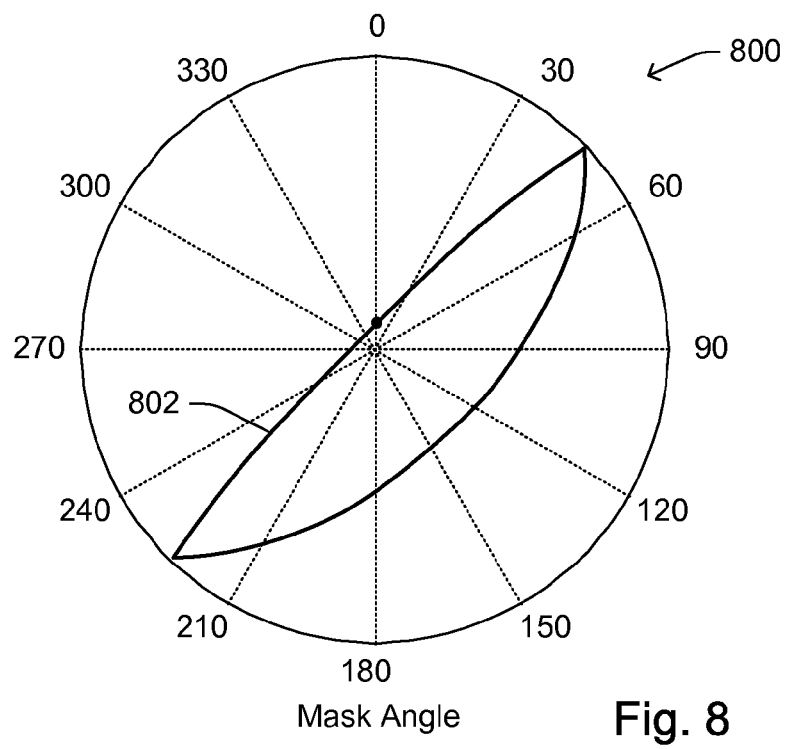
FIG. 8 is an illustrative graph showing an example visibility mask plotted in polar representation in accordance with an implementation.

Some visibility mask examples will now be described and illustrated. A simple example of a straight pathway with constant building height along a significant enough portion of the pathway may yield a characteristic visibility mask shape. FIG. 8 is a graph 800 illustrating an example of a visibility mask 802 plotted in polar representation, with pathway orientation at 45 degrees from true North, for a pathway of 23 meters wide, with a left hand building at 90 meters high, and right hand building at 20 meters high. In FIG. 8, the value of the satellite visibility mask is plotted along the radial direction, with the center corresponding to ninety degrees and the circumference of the circle corresponding to zero degrees. The point of view is taken at 10 meters from the building on the left hand side. As illustrated, it is clear that the directions at 45 degrees and 225 degrees corresponding to along-pathway directions are obstacle-free down to 0 degrees of elevation. The azimuth towards the highest building, at 315 degrees, has the highest elevation mask at about 82 degrees.

To represent such a shape with the reduced (perhaps minimum) number of points in a database, for example, one may reconstruct the shape mathematically, such that only a point at a given azimuth and elevation is necessary on each side of the pathway in this case, along with the general orientation of the pathway.

If a pathway has multiple buildings with varying heights and lengths, including cross pathways, the same type of representation may apply, with multiple transitions in the mask curve that may be encoded separately. Thus, it is not believed that such a visibility mask approach should create any significant limitations in the generality of the concepts presented herein.

If a satellite that might be used to make a distinction between two contiguous partitions is missing, then both regions may be combined into a single (possibly unique) one, however, the accuracy may be reduced.

If some pathways are parallel and have similar building heights and/or similar widths, then the visibility patterns may be significantly similar. This may increase the difficulty in determining which pathway the mobile device (receiver) is actually on. Here, as described above, it may be useful to consider positional history to track the trajectory. An initial position location determination may be performed more accurately when the receiver is at crossroads, e.g., where there are more LOS satellites to unambiguously determine the first crossroad.

As mentioned, a LOS/NLOS detector may be implemented to provide a LOS/NLOS detection. Such a detector may not be perfectly accurate, and in certain implementations, a soft decision may actually be preferable. The Bayesian networks should still work correctly. An example implementation of a detector may be based on heuristics about the width of the correlation peak. The width of the correlation peak, or more accurately its stretch compared to the nominal width may be an indirect measure of the Delay Spread (e.g., the difference of propagation delay between the shortest path and the longest path). There tends to be a tight correlation between Delay Spread and presence of multipath, and a looser correlation between presence of multipath and NLOS. Thus, for example, a small Delay Spread may represent a loose indication of a LOS situation, while a larger Delay Spread may represent a NLOS situation. In certain implementations, an atmospheric pressure sensor may be used as an alternate source for use in estimating altitude, for example, if altitude information is not available for a grid point in a database FIG. 9 includes a diagram 900 illustrating certain example signal reception angles with respect to an across-pathway position 901 (here, a true location) and a related graph 920. Note that, for illustration purposes, the example in diagram 900 depicts PseudoRange (PR) instead of PseudoRange single differences between satellites, as it should be, and only considers the vertical component of the PR difference, instead of the slant difference as it should be. Here, building 302-2 is shown along with an actual real path 902 of an SPS signal reflected off of wall 332, a modeled real path 904 of a ($PR_{measured}$) SPS signal, and an expected PR ($PR_{estimated}$) 906. Line 908 is the local vertical direction and line 912 represents an innovation error difference based on $PR_{measured}$ and $PR_{estimated}$. For example, an innovation error may be related to the difference between the $PR_{measured}$ and $PR_{estimated}$. Graph 920, for example, shows a NLOS probability 922 and LOS probability 924 plotted with respect to the innovation error.

Thus, for example, at a precise location of each grid point a mobile device may be enabled to compare, the measured PR versus expected PR single differences. Depending on whether the discrepancy is larger or smaller than the thermal noise (actually twice the thermal noise because of single differencing), a decision may be based on a proportion of LOS and NLOS, with a smooth transition from LOS to NLOS decision. The other satellite for forming the single difference may be beneficially chosen at a sufficiently high angle to reduce (possibly minimize) the chances of contribution of multipath to single difference, and/or to simplify the single difference interpretation. Thus, a LOS/NLOS set of measurements may be obtained that are conditioned to the a-priori location, and a measurement vector may be recalculated for each grid point.

The quality of an across-pathway position location determination may, in certain implementations, be dependent on the granularity of the sky angular sampling, and thus of the number of satellites in the sky. In a first order approximation of uniform spatial distribution of all satellites through the sky, and an approximately identical number of satellites per constellation, the across-pathway position location accuracy may be twice the accuracy of single constellation case, if we jointly use all satellites from two constellations. Thus, it may be useful for the receiver to be enabled to acquire SPS signals from a plurality of GNSS, and/or other like systems, and to jointly use all measurements from several GNSS constellations in the probabilistic positioning part of the method.

In certain example implementations, the histogram of across-street distance with no satellite visibility change over a large sample of locations, pathway widths, and satellite configurations may provide a 50% percentile estimate of cross-path distance without satellite visibility change. This number determines the potential accuracy of the across path positioning. Thus, one may, for example, sample (e.g., choose a grid width or spacing, etc.) at about twice this 50% percentile. In certain examples, therefore a spacing of about five meters across a pathway may be sufficient. Claimed subject matter is not however limited and may include grid spacing that is less than or greater than 5 meters, and/or uniform or non-uniform grid patterns, and/or the like.

As the geometry does not change significantly with a translation along the pathway, it is believed that a sampling grid of about 50 meters along-pathway may also be sufficient in certain example implementations. Claimed subject matter is not however limited and may include along-pathway grid spacing that is less than or greater than 50 meters, and/or uniform or non-uniform grid patterns, and/or the like.

As mentioned, in certain implementations, the grid spacing may be also and/or alternatively be non-uniform, (e.g., along and/or across the pathway), as the visibility mask may not significantly evolve along certain pathways. Such implementations may be useful in controlling and/or otherwise reducing the size of the enhanced database information, with a reasonable accuracy, and/or associated processing requirements.

With regard to the size of the enhanced database information, in one example, a metropolitan region that may be roughly contained in a square of about: 10 km$^2$×10 km$^2$=1.10$^8$ m$^2$. With a hypothetical ratio of 40% building footprint area and 60% open areas, the area to cover in the example enhanced database information may be approximately 1.10$^8$×0.6=6.10$^7$ m$^2$.

With a grid spacing (e.g., here a uniform tile size) of 5×50 m$^2$=250 m$^2$ (5 meters grid spacing across pathways, and 50 m along pathways), the total number of grid points will be 240,000 points. Assuming five conspicuous azimuth/elevation points per grid point and a resolution of one degree is azimuth and elevation so each point can be coded in two bytes, the minimum enhanced database information size (without overhead) may be approximately 240,000×5×2 bytes=2.4 Mbytes. With an assumed arbitrary overhead of about 10% (compressed latitude, longitude grid information, plus other possible formatting information), the total enhanced database information size may be estimated to be about 2.64 Mbytes. Of course this is just an example in which about 0.026 Bytes/m² of information may be reasonable for certain exemplary dense urban environments.

For a single step of an exemplary Bayesian Algorithm there may be a minimum number of grid points to consider. For example, if each grid point has a visibility mask associated with five azimuth/elevation directions, in an erroneous SPS position, a circular uncertainty error of about 50 m circular, or a number of grid points of about, $$GPN \cong \frac{\pi \cdot R^2}{A}(1 - F),$$

where GPN is the Grid Point Number, R is the SPS uncertainty circle (e.g., at 95% (in meters)), A is the grid tile size (in m²), and F is the building area/total area fill ratio. Thus, in this example, the GPN maybe about 18 grid points.

In accordance with certain aspects of the present description, the methods and apparatuses may use other propagation-related parameters that may be available in the enhanced database information.

For example, other types of propagation-related information may be used in the enhanced database information in complement and/or in substitution to a visibility mask, and applied to an exemplary probabilistic position computation technique. In certain instances, to be particularly effective, it may be desirable that such other parameter(s) be independent of the motion of the satellites (e.g., permanent), relatively stable over long periods (e.g., several months), represented in enhanced database information with the minimum number of bytes, have sufficient variability/contrast between two contiguous grid points to be usable for position determination, easily predictable by a radio propagation simulator and/or a 3D Database, and/or easily measurable in a receiver (e.g., with sufficient accuracy). Such a potential candidate parameter may, for example, include a multipath delay spread.

Attention is drawn next to FIG. 10, which is a graph 1000 illustrating a further example of several visibility masks plotted in polar representation, with pathway orientation at 0 degrees from true North, for a pathway of 23 meters wide, with a left hand building at 5 meters high, and right hand building at 5 meters high. Hence, this is a "low" building height partitioning example.

Here, five superimposed visibility masks are illustrated, namely, mask 1002 at 1 meter, mask 1004 at 6 meters, mask 1006 at 11 meters, mask 1008 at 16 meters, and mask 1010 at 21 meters from a building on the left hand side of the pathway. Also illustrated in graph 1000 are several example satellites (shown as stars identified by adjacent PRN numbers).

The satellite space may be partitioned, for example, as follows:

| | Offset from left building | | | | |
|---|---|---|---|---|---|
| PRN | 1 m | 6 m | 11 m | 16 m | 21 m |
| 3 | 0 | 0 | 1 | 1 | 1 |
| 6 | 1 | 1 | 1 | 1 | 0 |
| 7 | 1 | 1 | 1 | 1 | 0 |
| 14 | 0 | 1 | 1 | 1 | 1 |
| 16 | 0 | 0 | 0 | 1 | 1 |
| 18 | 1 | 1 | 1 | 1 | 1 |
| 21 | 1 | 1 | 1 | 1 | 0 |
| 22 | 0 | 1 | 1 | 1 | 1 |
| 24 | 1 | 1 | 1 | 0 | 0 |
| 26 | 1 | 1 | 1 | 0 | 0 |
| 29 | 1 | 1 | 0 | 0 | 0 |
| 32 | 0 | 0 | 1 | 1 | 1 |

Each transversal offset may have a (possibly unique) visibility signature that may be used to identify in which region of the pathway the receiver may be located.

Figure 11:
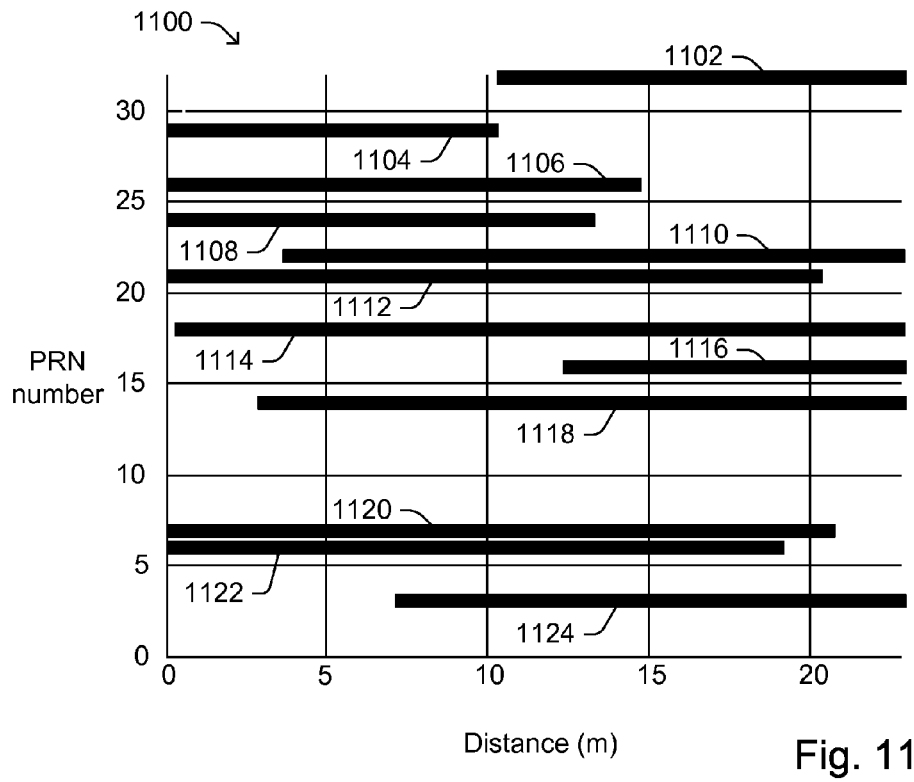
FIG. 11 is an illustrative graph showing example satellite visibility based on distance from an object in accordance with an implementation.

Hence, FIG. 11 shows a corresponding graph 1100 of satellite visibility versus distance from a building (to the left), in which the vertical axis lists a range of PRN numbers and the horizontal axis lists the distance in meters. As shown, line 1102 is associated with PRN 32, line 1104 is associated with PRN 29, line 1106 is associated with PRN 26, line 1108 is associated with PRN 24, line 1110 is associated with PRN 22, line 1112 is associated with PRN 21, line 1114 is associated with PRN 18, line 1116 is associated with PRN 16, line 1118 is associated with PRN 14, line 1120 is associated with PRN 7, line 1122 is associated with PRN 6, and line 1124 is associated with PRN 3.

Figure 12:
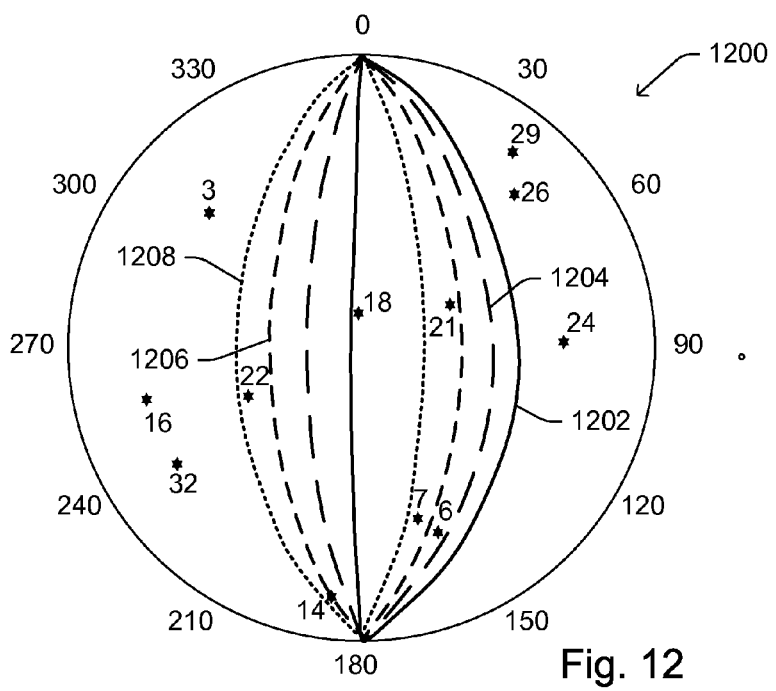
FIG. 12 is an illustrative graph showing another example visibility mask plotted in polar representation in accordance with an implementation.

Attention is drawn next to FIG. 12, which is a graph 1200 illustrating another example of several visibility masks plotted in polar representation, with pathway orientation at 0 degrees from true North, for a pathway of 23 meters wide, with a left hand building at 20 meters high, and right hand building at 20 meters high. Hence, this is a "medium" building height partitioning example.

Here, four superimposed visibility masks are illustrated, namely, mask 1202 at 1 meter, mask 1204 at 6 meters, mask 1206 at 11 meters, and mask 1208 at 16 meters from a building on the left hand side of the pathway. Also illustrated in graph 1000 are several example satellites (shown as stars identified by adjacent PRN numbers).

Figure 13:
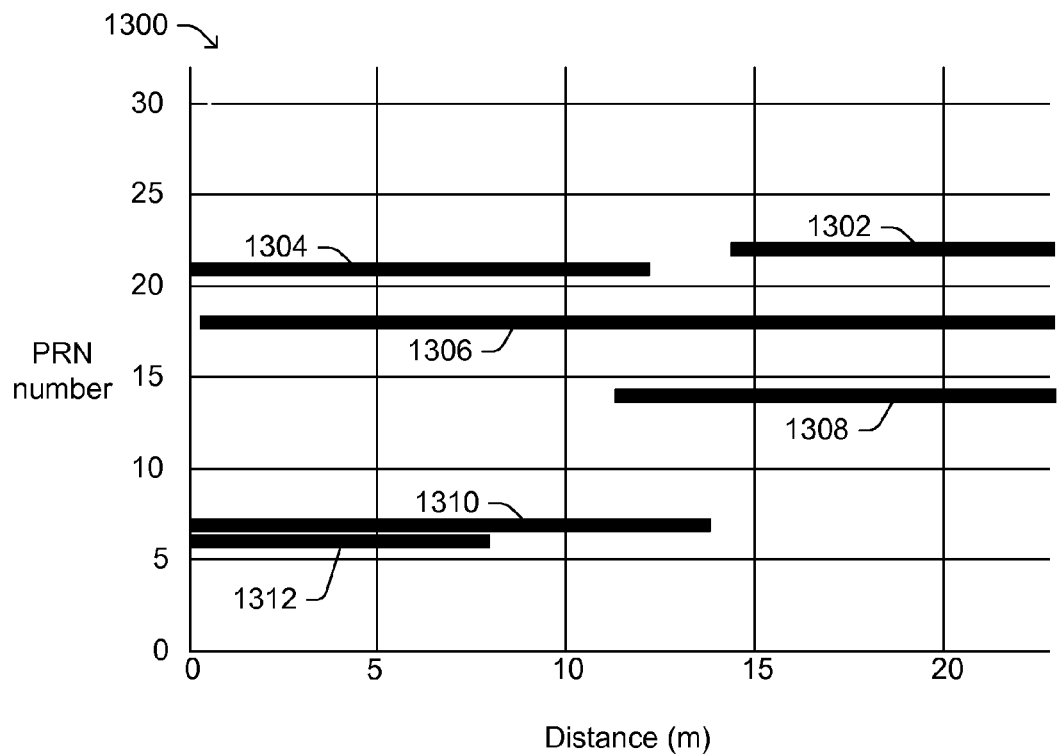
FIG. 13 is an illustrative graph showing example satellite visibility based on distance from an object in accordance with an implementation.

Hence, FIG. 13 shows a corresponding graph 1300 of satellite visibility versus distance from a building (to the left), in which the vertical axis lists a range of PRN numbers and the horizontal axis lists the distance in meters. As shown, line 1302 is associated with PRN 22, line 1304 is associated with PRN 21, line 1306 is associated with PRN 18, line 1308 is associated with PRN 14, line 1310 is associated with PRN 7, and line 1312 is associated with PRN 6.

Figure 14:
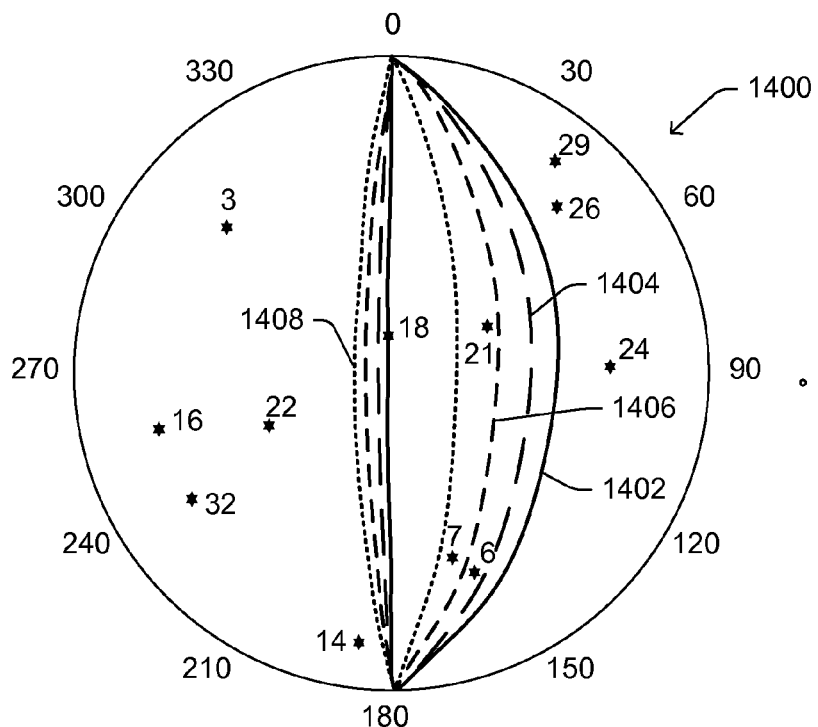
FIG. 14 is an illustrative graph showing an additional example visibility mask plotted in polar representation in accordance with an additional implementation.

Attention is drawn next to FIG. 14, which is a graph 1400 illustrating an additional example of several visibility masks plotted in polar representation, with pathway orientation at 0 degrees from true North, for a pathway of 23 meters wide, with a left hand building at 90 meters high, and right hand building at 20 meters high. Hence, this is a "mixed (medium/high)" building height partitioning example.

Here, four superimposed visibility masks are illustrated, namely, mask 1402 at 1 meter, mask 1404 at 6 meters, mask 1406 at 11 meters, and mask 1408 at 16 meters from the taller building on the left hand side of the pathway. Also illustrated in graph 1000 are several example satellites (shown as stars identified by adjacent PRN numbers).

Figure 15:
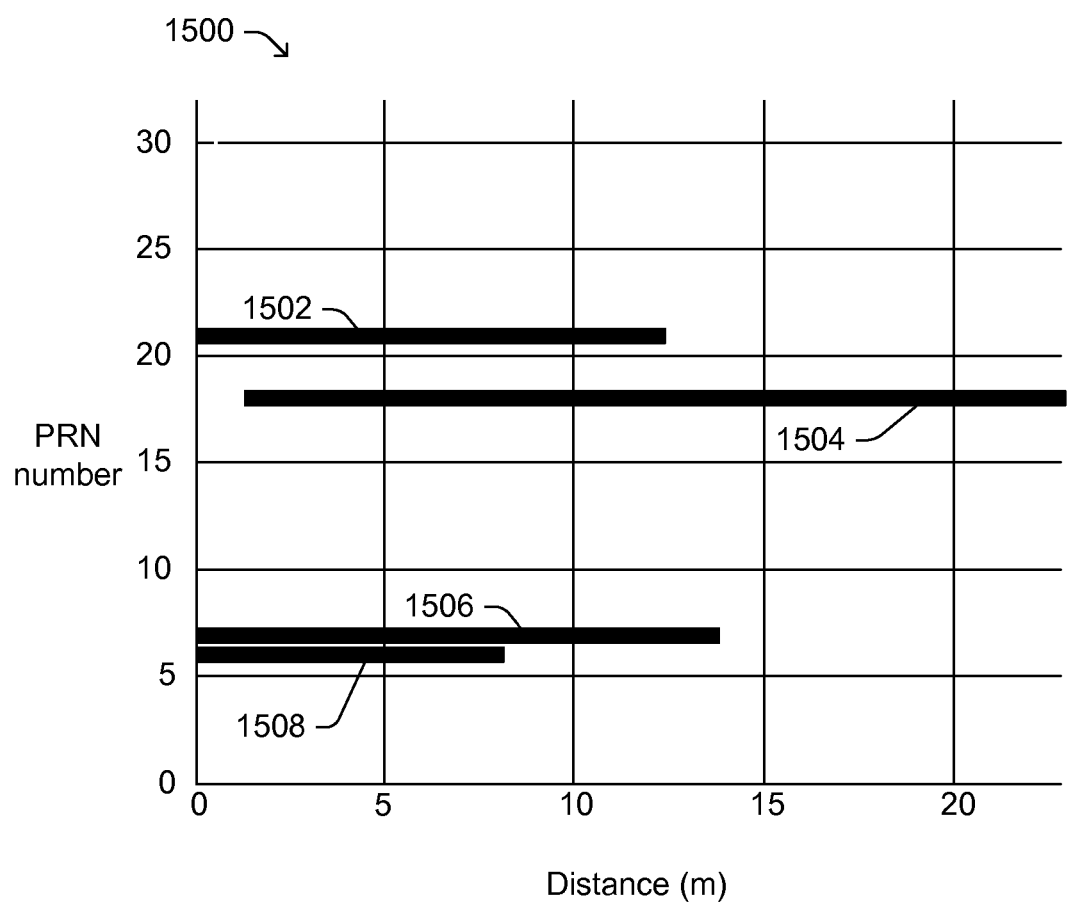
FIG. 15 is an illustrative graph showing an example satellite visibility based on distance from an object in accordance with an implementation.

Hence, FIG. 15 shows a corresponding graph 1500 of satellite visibility versus distance from a building (again to the left), in which the vertical axis lists a range of PRN numbers and the horizontal axis lists the distance in meters. As shown, line 1502 is associated with PRN 21, line 1504 is associated with PRN 18, line 1506 is associated With PRN 7, and line 1508 is associated with PRN 6.

Figure 18:
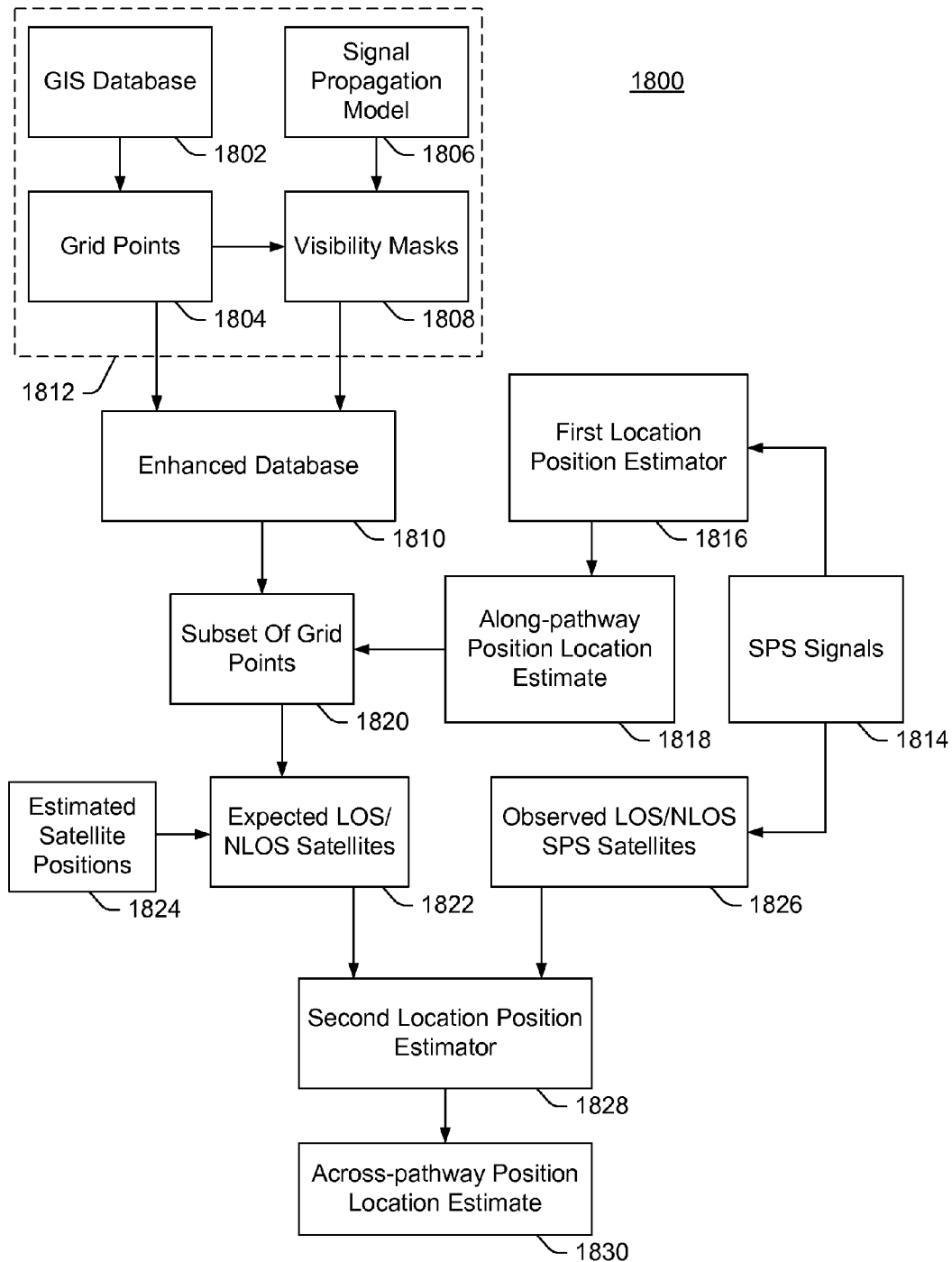
FIG. 18 is an example signal processing/transformation flow-diagram in accordance with an implementation.

Attention is drawn next to FIG. 18, which shows a signal processing/transformation flow 1800 to further illustrate certain aspects of the example techniques described herein.

Here, a three-dimensional GIS or other like database 1802 may be processed to produce grid points 1804. Visibility mask 1808 may be processed based, at least in part, on grid points 1804 and signal propagation model 1806. An initial processing stage 1812 is shown, which may, for example, be performed by processing at one or more computing platforms specially established based on instructions. Initial processing stage 1812 may, for example, produce enhanced database 1810. A subset of grid points 1820 may be extracted from enhanced database 1810 based, at least in part, on alongpathway position location estimate 1818. Along-pathway position location estimate 1818 may be generated by a first location position estimator 1816, which may process acquired SPS signals 1814. For example, first location position estimator 1816 may implement a geometric analysis process based, at least in part, on pseudorange measurements from acquired SPS signals. Expected LOS/NLOS satellites masking information 1822 may be determined for each grid point represented by subset of grid point 1820 based, at least in part, on estimated satellite positions 1824. Observed LOS/NLOS SPS satellite masking information 1826 may be determined based, at least in part, on SPS signals 1814. For example, a LOS/NLOS detector may generate observed LOS/NLOS SPS satellite signals 1826. A second location position estimator 1828 may process observed LOS/NLOS SPS satellite masking information 1826 and expected LOS/NLOS satellite masking information 1822 to generate estimated across-pathway position location 1830. For example, second location position estimator 1828 may implement a probabilistic analysis process based, at least in part, on various probabilistic attribute signals.

The example position location determination techniques described herein may be used in stand alone or otherwise substantially autonomous mobile devices, and/or for mobile devices enabled to provide additional functionality, for example, through the use of various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project." (3GPP). Cdma2000 is described in documents from a consortium named "3rd Generation Partnership Project 2" (3GPP2)·3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN.

A mobile device may receive SPS signals from various satellites or the like, which may be from a Global Positioning System (GPS), Galileo, GLONASS, NAVSTAR, GNSS, a system that uses satellites from a combination of these systems, or any SPS developed in the future, each referred to generally herein as a "Satellite Positioning System" (SPS).

Furthermore, the methods and apparatuses described herein may be used with position location determination systems that utilize pseudolites or a combination of satellites and pseudolites. Pseudolites may include ground-based transmitters that broadcast a PN code or other ranging code (e.g., similar to a GPS or CDMA cellular signal) modulated on an L-band (or other frequency) carrier signal, which may be synchronized with SPS time. Each such transmitter may be assigned a unique PN code so as to permit identification by a remote receiver. Pseudolites may be useful in situations where SPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites.

As used herein, a mobile device refers to a device that may acquire at least SPS signals for use in position location determination. In certain examples, a mobile device may include a cellular or other wireless communication device, personal communication system (PCS) device, personal navigation device, a vehicle mountable navigation device, a tracking device, Personal Information Manager (PIM), Personal Digital Assistant (PDA), laptop or other suitable mobile device which may be capable of receiving wireless communications. A mobile device may, for example, include devices which communicate with a personal navigation device (PND), such as by short-range wireless, infrared, wireline connection, or other connection—regardless of whether satellite signal reception, assistance data reception, and/or position-related processing occurs at the device or at the PND. Certain mobile devices may, for example, include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above may also be considered a "mobile device".

The methodologies described herein may be implemented by various means depending upon the application. For example, these methodologies may be implemented in hardware, firmware, software, or a combination thereof. For a hardware implementation, one or more processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory of a mobile device, and executed by a processing unit of the mobile device. Memory may be implemented within a processing unit and/or external to the processing unit. As used herein the term "memory" refers to any type of long term, short term, volatile, nonvolatile, or other memory and is not to be limited to any particular type of memory or number of memories, or type of media upon which memory is stored.

If implemented in software, the functions that implement the methodologies or portions thereof may be stored on and/or transmitted over as one or more instructions or code on a computer-readable medium. A computer-readable medium may take the form of an article of manufacture. A computer-readable medium may include computer storage media and/or communication media including any medium that facilitates transfer of a computer program from one place to another. A storage media may be any available media that may be accessed by a computer or like device. By way of example but not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable medium.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing unit having a command set which includes the encoded commands. Such an instruction may be encoded in the form of a machine language understood by the processing unit. Again, these are merely examples of an instruction and claimed subject matter is not limited in this respect.

While some portions of the detailed description have been presented in terms of algorithms or symbolic representations of operations on binary digital signals stored within a memory of a specific apparatus or special purpose computing device or platform in the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent in this description, terms such as "processing", "computing", "calculating", "enabling", "identifying", "detecting", "obtaining", "estimating", "associating", "receiving", "transmitting"'"acquiring", "providing", "storing", "accessing", "determining", or the like refer to actions or processes of a specific apparatus, such as a special purpose computer or a similar special purpose electronic computing device. In tire context of this specification, therefore, a special purpose computer or a similar special purpose electronic computing device may be capable of manipulating or transforming signals, typically represented as physical electronic or magnetic quantities within memories, registers, or other information storage devices, transmission devices, or display devices of the special purpose computer or similar special purpose electronic computing device.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method for use in at least one electronic device, the method comprising:
   with said at least one electronic device:
     accessing a satellite signal visibility mask for at least one satellite enabled to transmit an RF signal;
     establishing an enhanced database for at least a plurality of point locations based, at least in part, on said satellite signal visibility mask;
     providing at least a portion of said enhanced database to at least one mobile device; and
     wherein said signal visibility mask for each of said plurality of point locations comprises a mask function to establish an expected azimuth/elevation mask for at least one of a potential line-of-sight (LOS) signal reception, and/or a potential non-line-of-sight (NLOS) signal reception.

2. The method as recited in claim 1, wherein said at least one satellite comprises a satellite positioning system (SPS) space vehicle (SV) and said satellite signal visibility mask comprises an SPS signal visibility mask.

3. The method as recited in claim 1, further comprising:
   with said at least one electronic device:
     establishing a plurality of point locations geographically distributed within at least one open area portion of a region; and
     establishing said signal visibility mask for each of said plurality of point locations based, at least in part, on at least a portion of a three-dimensional geographical database.

4. The method as recited in claim 3, wherein said portion of three-dimensional geographical database comprises a geographic information system (GIS) database specifying said at least one open area and at least a height for at least one object adjacent said at least one open area.

5. The method as recited in claim 4, wherein said at least one open area comprises at least a pathway, and said at least one object comprises at least one of a building and/or a structure.

6. The method as recited in claim 5, wherein said pathway comprises at least a street.

7. The method as recited in claim 1, wherein at least a portion of said plurality of point locations is geographically distributed in a grid.

8. The method as recited in claim 7, wherein said at least one area comprises at least a pathway, and wherein at least a portion of said grid is aligned with at least one of an along-pathway direction and/or an across-pathway direction.

9. The method as recited in claim 7, wherein said grid is non-uniform in at least one direction.

10. The method as recited in claim 1, wherein said enhanced database comprises geographical coordinates for each of said plurality of point locations and said mask function for each of said plurality of point locations.

11. The method as recited in claim 1, wherein said enhanced database comprises geographical coordinates for each of said plurality of point locations and said signal visibility mask for each of said plurality of point locations.

12. The method as recited in claim 1, further comprising:
with said at least one electronic device, storing at least a portion of said enhanced database to at least one mobile device.

13. The method as recited in claim 1, wherein providing at least said portion of said enhanced database to said at least one mobile device comprises storing at least said portion of said enhanced database in a memory of said at least one mobile device.

14. A method for use in at least one electronic device, the method comprising:
with said at least one electronic device:
establishing a signal visibility mask for each of a plurality of point locations geographically distributed within at least one open area portion of a region based, at least in part, on at least a portion of three-dimensional geographical database;
accessing said satellite signal visibility mask for at least one satellite enabled to transmit an RF signal;
establishing an enhanced database for at least said plurality of point locations based, at least in part, on said satellite signal visibility mask; and
providing at least a portion of said enhanced database to at least one mobile device.

15. The method as recited in claim 14, wherein said at least one satellite comprises a satellite positioning system (SPS) space vehicle (SV) and said satellite signal visibility mask comprises an SPS signal visibility mask.

16. The method as recited in claim 14, wherein said portion of three-dimensional geographical database comprises a geographic information system (GIS) database specifying said at least one open area and at least a height for at least one object adjacent said at least one open area.

17. The method as recited in claim 16, wherein said at least one open area comprises at least a pathway, and said at least one object comprises at least one of a building and/or a structure.

18. The method as recited in claim 17, wherein said pathway comprises at least a street.

19. The method as recited in claim 14, wherein at least a portion of said plurality of point locations is geographically distributed in a grid.

20. The method as recited in claim 19, wherein said at least one area comprises at least a pathway, and wherein at least a portion of said grid is aligned with at least one of an along-pathway direction and/or an across-pathway direction.

21. The method as recited in claim 19, wherein said grid is non-uniform in at least one direction.

22. The method as recited in claim 14, wherein said signal visibility mask for each of said plurality of point locations comprises a mask function to establish an expected azimuth/elevation mask for at least one of a potential line-of-sight (LOS) signal reception, and/or a potential non-line-of-sight (NLOS) signal reception.

23. The method as recited in claim 22, wherein said enhanced database comprises geographical coordinates for each of said plurality of point locations and said mask function for each of said plurality of point locations.

24. The method as recited in claim 14, wherein said enhanced database comprises geographical coordinates for each of said plurality of point locations and said signal visibility mask for each of said plurality of point locations.

25. The method as recited in claim 14, further comprising:
with said at least one electronic device, storing at least a portion of said enhanced database to at least one mobile device.

26. The method as recited in claim 14, wherein providing at least said portion of said enhanced database to said at least one mobile device comprises storing at least said portion of said enhanced database in a memory of said at least one mobile device.

* * * * *